(12) United States Patent
Terauchi et al.

(10) Patent No.: US 7,732,700 B2
(45) Date of Patent: Jun. 8, 2010

(54) PLAYBACK DEVICE, CONTENTS SELECTING METHOD, CONTENTS DISTRIBUTION SYSTEM, INFORMATION PROCESSING DEVICE, CONTENTS TRANSFER METHOD, AND STORING MEDIUM

(75) Inventors: Toshiro Terauchi, Tokyo (JP); Toru Sasaki, Tokyo (JP); Yuichi Sakai, Kanagawa (JP); Susumu Takatsuka, Tokyo (JP); Yoichiro Sako, Tokyo (JP); Hirofumi Tamori, Tokyo (JP); Makoto Inoue, Tokyo (JP); Katsuya Shirai, Kanagawa (JP); Motoyuki Takai, Tokyo (JP); Kenichi Makino, Kanagawa (JP); Takatoshi Nakamura, Kanagawa (JP); Akihiro Komori, Tokyo (JP); Akane Sano, Tokyo (JP)

(73) Assignee: Sony Corporation, Tokyo (JP)

( * ) Notice: Subject to any disclaimer, the term of this patent is extended or adjusted under 35 U.S.C. 154(b) by 665 days.

(21) Appl. No.: 11/705,957

(22) Filed: Feb. 13, 2007

(65) Prior Publication Data

US 2007/0221045 A1 Sep. 27, 2007

(30) Foreign Application Priority Data

Feb. 21, 2006 (JP) ............................. 2006-043729

(51) Int. Cl.
    *G10H 7/00* (2006.01)
(52) U.S. Cl. ...................................................... 84/612
(58) Field of Classification Search ................... 84/612; 482/3–9, 900–901; 700/94
    See application file for complete search history.

(56) References Cited

U.S. PATENT DOCUMENTS

| 2003/0060728 A1 | 3/2003 | Mandigo |
| 2005/0249080 A1 | 11/2005 | Foote |
| 2006/0107822 A1* | 5/2006 | Bowen ........................ 84/612 |
| 2006/0243120 A1* | 11/2006 | Takai et al. ................... 84/612 |
| 2007/0074619 A1* | 4/2007 | Vergo .......................... 84/612 |
| 2007/0079691 A1* | 4/2007 | Turner ......................... 84/612 |

FOREIGN PATENT DOCUMENTS

| EP | 1 705 588 A1 | 9/2006 |
| EP | 1 729 290 A1 | 12/2006 |
| JP | 10-011463 A | 1/1998 |
| JP | 10-063265 A | 3/1998 |
| JP | 11-288420 A | 10/1999 |
| JP | 2002-73041 A | 3/2002 |
| JP | 2002-259265 A | 9/2002 |
| JP | 2003-030969 A | 1/2003 |
| JP | 2003-085888 A | 3/2003 |

(Continued)

*Primary Examiner*—Jeffrey Donels
(74) *Attorney, Agent, or Firm*—Wolf, Greenfield & Sacks, P.C.

(57) ABSTRACT

A playback device includes a storing unit storing a contents database in which contents including at least music and tempo information indicating the tempo of the music are correlated with each other; a playback unit for performing playback of the contents; a tempo measuring unit for measuring an exercise tempo obtained along with the body movements of a user; a searching unit for searching contents from the contents database based on the information of the measured exercise tempo by the tempo measuring unit; and a contents selecting unit for selecting the contents searched by the searching unit as contents to be played by the playback unit.

16 Claims, 17 Drawing Sheets

FOREIGN PATENT DOCUMENTS

| | | |
|---|---|---|
| JP | 2003-108154 A | 4/2003 |
| JP | 2004-113552 A | 4/2004 |
| JP | 2004-227285 A | 8/2004 |
| JP | 2005-31644 A | 2/2005 |
| JP | 2005-292730 A | 10/2005 |
| JP | 2006-301276 A | 11/2006 |
| JP | 2007-149218 A | 6/2007 |
| WO | WO 97/05616 A1 | 2/1997 |
| WO | WO 01/67266 A1 | 9/2001 |

* cited by examiner

FIG. 4

| CONTENTS DATA | ADDITIONAL INFORMATION | | | | |
|---|---|---|---|---|---|
| | ATTRIBUTE INFORMATION | | | | TEMPO |
| | TITLE | ARTIST | GENRE | YEAR OF RELEASE | |
| | | | | | |
| | | | | | |
| ... | ... | ... | ... | ... | ... |
| | | | | | |

PLAYBACK DEVICE, CONTENTS SELECTING METHOD, CONTENTS DISTRIBUTION SYSTEM, INFORMATION PROCESSING DEVICE, CONTENTS TRANSFER METHOD, AND STORING MEDIUM

CROSS REFERENCES TO RELATED APPLICATIONS

The present invention contains subject matter related to Japanese Patent Application JP 2006-043729 filed in the Japanese Patent Office on Feb. 21, 2006, the entire contents of which are incorporated herein by reference.

BACKGROUND OF THE INVENTION

1. Field of the Invention

The present invention relates to a playback device for performing playback regarding contents, and a contents selecting method for selecting contents to be played. Also, the present invention relates to a contents distribution system and a contents distribution method, and further, an information processing device, a contents transfer method, and a storing medium.

2. Description of the Related Art

As audio players have become smaller and lighter, carrying an audio player to enjoy music contents has become commonplace.

Note that Japanese Unexamined Patent Application Publication No. 2005-31644 can be given an example of the related existing technology.

SUMMARY OF THE INVENTION

In recent years, portable audio players are being used to enjoy music contents while performing physical exercise such as walking, jogging, dancing, or the like.

Particularly, using portable audio players in such a manner in recent years has led to needs for playing the music suitable for the tempo of exercise has been increased. This means that the music matching the tempo of physical exercise is played.

Under the present circumstances, in the event of playing the music corresponding to an exercise tempo in such a manner, it is necessary for a user to select the music composition having a tempo suitable for an exercise tempo that the user performs beforehand, and register this as a playlist or the like, following which it is necessary for the user to follow the procedure such as starting exercise such as walking, jogging, or the like after starting playback regarding this registered playlist.

However, in order to manually select the music composition corresponding to an exercise tempo as described above, it is necessary for the user to search an exercise tempo by himself/herself, and then look for the music composition matching the tempo thereof while trying listening to the music composition for example, which takes too much time and effort.

Thus, such time-consuming work becomes an obstacle when enjoying the music composition matching an exercise tempo freely in that it is necessary for the user to perform such work before starting exercise beforehand as described above.

To this end, in light of the problems as described above, a playback device according to an embodiment of the present invention is configured as follows.

That is to say, the playback device according to an embodiment of the present invention includes storing means storing a first contents database in which contents including at least music and tempo information indicating the tempo of the music are correlated with each other, and playback means for performing playback of the contents.

Also, the playback device according to an embodiment of the present invention includes tempo measuring means for measuring an exercise tempo obtained along with the body movements of a user.

Also, the playback device according to an embodiment of the present invention includes searching means for searching contents from the first contents database based on the information of the measured exercise tempo by the tempo measuring means.

Additionally, the playback device according to an embodiment of the present invention includes contents selecting means for selecting the contents searched by the searching means as contents to be played by the playback means.

According to the playback device having the above configuration, based on the exercise tempo of a user that has been automatically measured, the contents having a tempo corresponding to the exercise tempo thereof can be selected automatically.

Thus, according to the present invention, based on the information of the exercise tempo of a user that is automatically measured, the contents having a tempo corresponding to the exercise tempo thereof can be selected automatically, so in the event of enjoying the music corresponding to an exercise tempo, time and effort can be reduced, such as having the user measure a tempo when performing an exercise beforehand, and also having the user select the contents having the appropriate tempo matching the tempo of the exercise that the user performs by himself/herself, and so forth.

That is to say, thus, the present invention allows a user to enjoy the contents matching an exercise tempo freely.

BRIEF DESCRIPTION OF THE DRAWINGS

FIG. 4 is a data structure diagram illustrating the data structure of a contents database according to an embodiment;

DESCRIPTION OF THE PREFERRED EMBODIMENTS

Description will be made below regarding the preferred forms for implementing the present invention (hereafter, referred to as embodiments).

First Embodiment

<System Overview>

Figure 1:
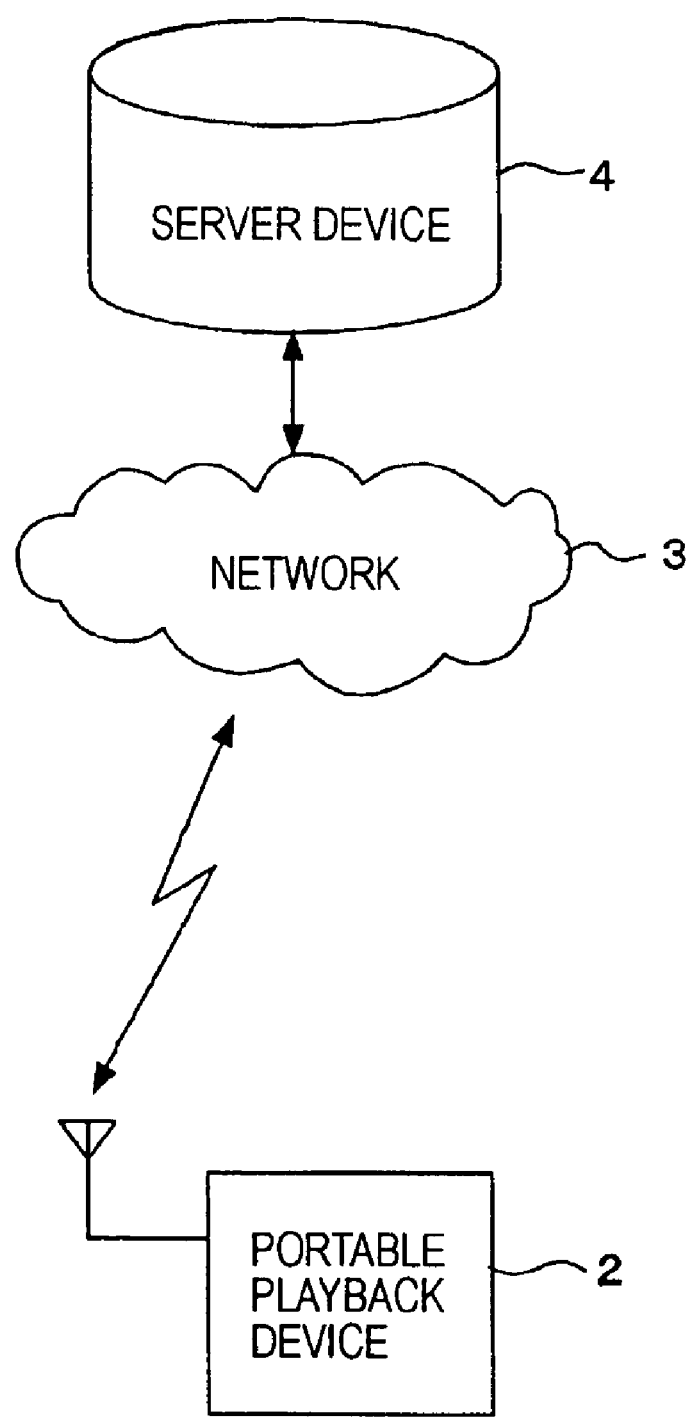
FIG. 1 is a diagram for describing the overview of a contents distribution system according to a first embodiment of the present invention.

FIG. 1 is a diagram for describing the overview of a contents distribution system 1 according to a first embodiment.

As illustrated in this drawing, the contents distribution system 1 according to the first embodiment includes a portable playback device 2 serving as a portable type audio player, and at least a server device 4. In this case, the portable playback device 2 is equivalent to the playback device mentioned at the present invention, and the server device 4 is equivalent to the server device mentioned at the present invention.

The portable playback device 2 includes a function for wirelessly connecting to a network 3, the Internet for example. In other words, the portable playback device 2 can connect to the network 3 by performing wireless communication with an unshown transponder connected to the network 3.

According to such a network connection function, the portable playback device 2 can perform data communication with the server device 4 connected to the network 3.

With the contents distribution system 1 according to the first embodiment, the portable playback device 2 is arranged so as to become a distribution destination regarding the contents stored in the server device 4. As for a specific distribution form of contents, for example, the user of the portable playback device 2 causes the portable playback device 2 to access to a predetermined contents distribution site over the Internet that is realized at the server device 4 side, and select the desired contents over this site. Subsequently, the contents thus selected by the user is arranged so as to be downloaded to the portable playback device 2.

In this case, an arrangement is made wherein the contents to be downloaded is music (music composition), and accordingly, a music data file stored at the server device 4 side is downloaded to the portable playback device 2.

Note that a contents distribution service in this case is assumed to be a service wherein billing does not occur for each music composition, and music files are downloadable without any restriction by the payment of flat-rate fees, such as a monthly amount.

With the server device 4, a great number of music data files in increments of music composition are stored therein as contents data to be distributed to the portable playback device 2 side. In this case, the additional information thereof is stored in each of the contents data in a correlated manner. That is to say, as for the additional information of a music composition serving as contents, for example, the title (composition name), genre, artist, year of release (e.g., information of the date when the music composition was released), and so forth of the music composition thereof are correlated.

With the portable playback device 2, when downloading the contents from the server device 4 side, such additional information is also downloaded along with a music data file serving as contents data. Thus, with the portable playback device 2, based on such additional information, for example, information such as a title regarding the contents data being played, and so forth can be presented to a user.

Note that the above additional information correlated with each of the contents with the present embodiment will be described later.

<Configuration of Playback Device>

Figure 2:
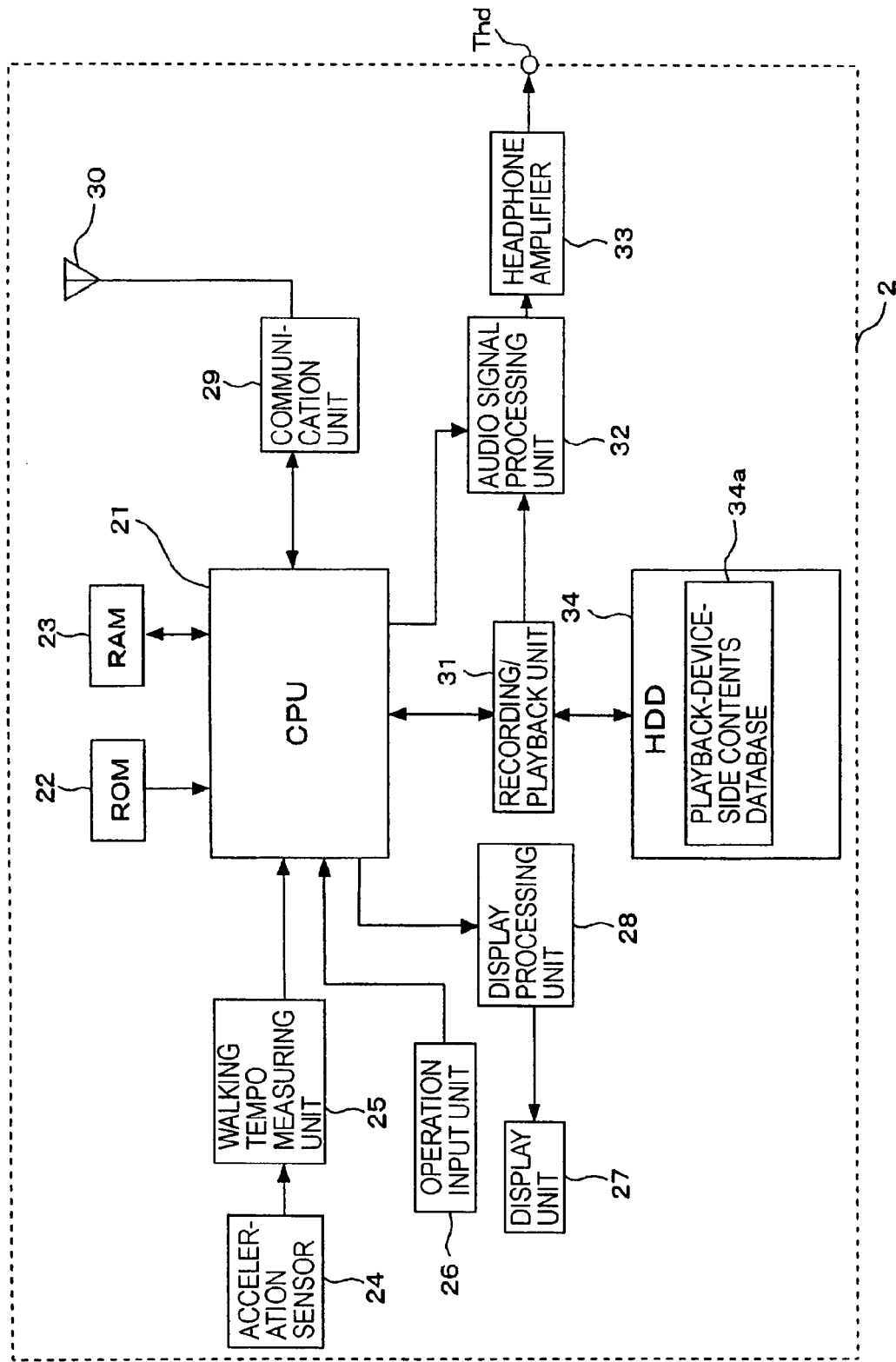
FIG. 2 is a block diagram illustrating the internal configuration of a playback device according to the first embodiment.

FIG. 2 is a block diagram illustrating the internal configuration of the portable playback device 2 illustrated in FIG. 1.

In FIG. 2, first, a CPU (Central Processing Unit) 21 performs control of the entire portable playback device 2, and calculation processing based on a program activated. For example, the CPU 21 performs input/output operations as to the user, control of recording/playback of data using an HDD (Hard Disc Drive) 34, and so forth.

As illustrated in the drawing, ROM (Read Only Memory) 22 and RAM (Random Access Memory) 23 are provided as to the CPU 21.

The operation program of the CPU 21, a program loader, various types of operation coefficients, parameters used for the program, and so forth are stored in the ROM 22. Also, a data region and a task region necessary for executing the program are temporarily secured in the RAM 23.

Note that various types of functions to be realized by the processing of the CPU 21 will be described anew later.

An operating input unit 26 is, for example, an input device using unshown operating keys provided so as to protrude to the outer face of the casing of the portable playback device 2, which is used for various types of operation input, and data input by the user. The information input from the operating input unit 26 is propagated as the input information of operation or data as to the CPU 21. The CPU 21 performs necessary calculation or control in accordance with the input information.

A display unit 27 includes a display panel such as a liquid crystal panel or the like for example, which displays various types of information as to the user. A display processing unit 28 drives the display unit 27 to execute display operations based on the display data supplied from the CPU 21 depending on various types of operation status, input status, and communication status.

A communication unit 29 and an antenna 30 are provided for performing data communication with external equipment (server device 4 in this case) connected to the network 3 illustrated in FIG. 1.

The communication unit 29 subjects the transmission data supplied from the CPU 21 to predetermined encoding processing, and performs data communication with the transponder (not shown) described in FIG. 1 via the antenna 30 so as to transmit the transmission data thereof to predetermined equipment (particularly, server device 4) over the network 3. Also, the communication unit 29 subjects the data (music data files and additional information thereof) transmitted from external equipment such as the server device 4 or the like, via the network 3 and the antenna 30, to predetermined decoding processing, and delivers this to the CPU 21.

A recording/playback unit 31 is provided for performing processing for generating recording data as to the HDD 34 serving as a storing medium, and subjecting the data read out from the HDD 34 to playback processing.

For example, when recording data to the HDD 34, the recording/playback unit 31 subjects the data supplied from the CPU 21 (in this case, the music data file received as communication data, and the additional information thereof) to predetermined encoding processing to generate recoding data. Subsequently, the recording/playback unit 31 delivers this recording data to the HDD 34 to record this.

Also, the recording/playback unit 31 subjects the data read out from the HDD 34 to predetermined decoding processing to obtain playback data at the time of playback. The recording/playback unit 31 supplies music data (audio data) to be played to an audio signal processing unit 32. Also, as for the additional information of music data to be played, the recording/playback unit 31 supplies this to the CPU 21. At this time, the CPU 21 generates display data based on the additional information to supply this to the display processing unit 28, whereby information such as the title name regarding the audio data being played can be displayed on the display unit 27 using characters or the like.

The audio signal processing unit 32 subjects the supplied audio data to predetermined audio signal processing based on the control of the CPU 21. For example, the audio signal processing unit 32 may subjects the supplied audio data to volume adjustment processing or the like based on the instruction value from the CPU 21.

The audio data subjected to audio signal processing at the audio signal processing unit 32 is converted from digital to analog, following which is amplified at a headphone amplifier 33, and supplied to a headphone terminal Thd shown in the drawing. Thus, audio output can be performed through the headphone (not shown) connected to the headphone terminal Thd.

A playback-device-side contents database 34a is stored in the HDD 34, as shown in the drawing.

This playback-device-side contents database 34a is generated from the contents distributed from the server device 4 side to the portable playback device 2 via the network 3, and the additional information thereof. In other words, in this case, the playback-device-side contents database 34a is a database made up of a music data file and the additional information thereof in a correlated manner.

Correlation between a music data file and the additional information thereof is realized with the contents management information similarly stored in the HDD 34, for example. That is to say, the CPU 21 reads out the relevant contents management information, whereby understanding the correlation between each of the contents and the additional information thereof.

Note that description will be made later regarding the data structure of the playback-device-side contents database 34a according to the present embodiment.

Also, a configuration for measuring the exercise tempo of the user is added to the portable playback device 2 according to the present embodiment.

Now, the above exercise tempo means a regular exercise cycle obtained when the user moving his/her body, performing physical exercise such as walking, jogging, dancing, or the like. Such an exercise tempo can be obtained by measuring the cycle of change in acceleration applied to the relevant portable playback device 2 in a state of being held by the exercising user. Alternatively, in the event of the type of assumed exercise of the user accompanying a twist, or the like, a regular exercise cycle can be obtained by measuring the cycle of change of direction using a direction sensor (gyro sensor).

With the present embodiment, let us say that the assumed physical exercise of the user is walking, and the above exercise tempo is a walking tempo, as one example. Along therewith, a case will be illustrated wherein an acceleration sensor is used at the time of measuring a tempo, and the cycle of change in acceleration detected by the acceleration sensor is measured, thereby measuring an exercise tempo (walking tempo).

In response to this, the portable playback device 2 is provided with an acceleration sensor 24 and a walking tempo measuring unit 25 shown in the drawing.

The acceleration sensor 24 detects acceleration, and supplies the detection result to the walking tempo measuring unit 25. The walking tempo measuring unit 25 measures the cycle of change in the acceleration detected by the acceleration sensor 24, and obtains the cycle information thereof as walking tempo information. In this case, as for the walking tempo information, an average cycle per predetermined time is measured. Specifically, with the shortest, a walking tempo can be measured by dividing two times of the number of times of change in the acceleration obtained according to the pace for two steps of the user by the time which it took, but thus, if the cycle of the extremely small number of steps is measured, the possibility that an exact tempo will be immeasurable becomes high. Accordingly, an arrangement is made wherein a certain amount of detection time is provided, and average tempo information is acquired based on the number of times of change in the acceleration obtained by within the time.

Also, as for tempo information in the case of the present embodiment, in order to match the same reference as the tempo information appended at the contents side, the information averaged with minute increments as the reference is obtained. In other words, as for the tempo information at the composition side in this case, BPM (Beat per Minute) is employed, so in accordance with this, the cycle information averaged with minute increments as reference is calculated.

The information of the walking tempo thus measured by the walking tempo measuring unit 25 is supplied to the CPU 21.

<Configuration of Server Device>

Figure 3:
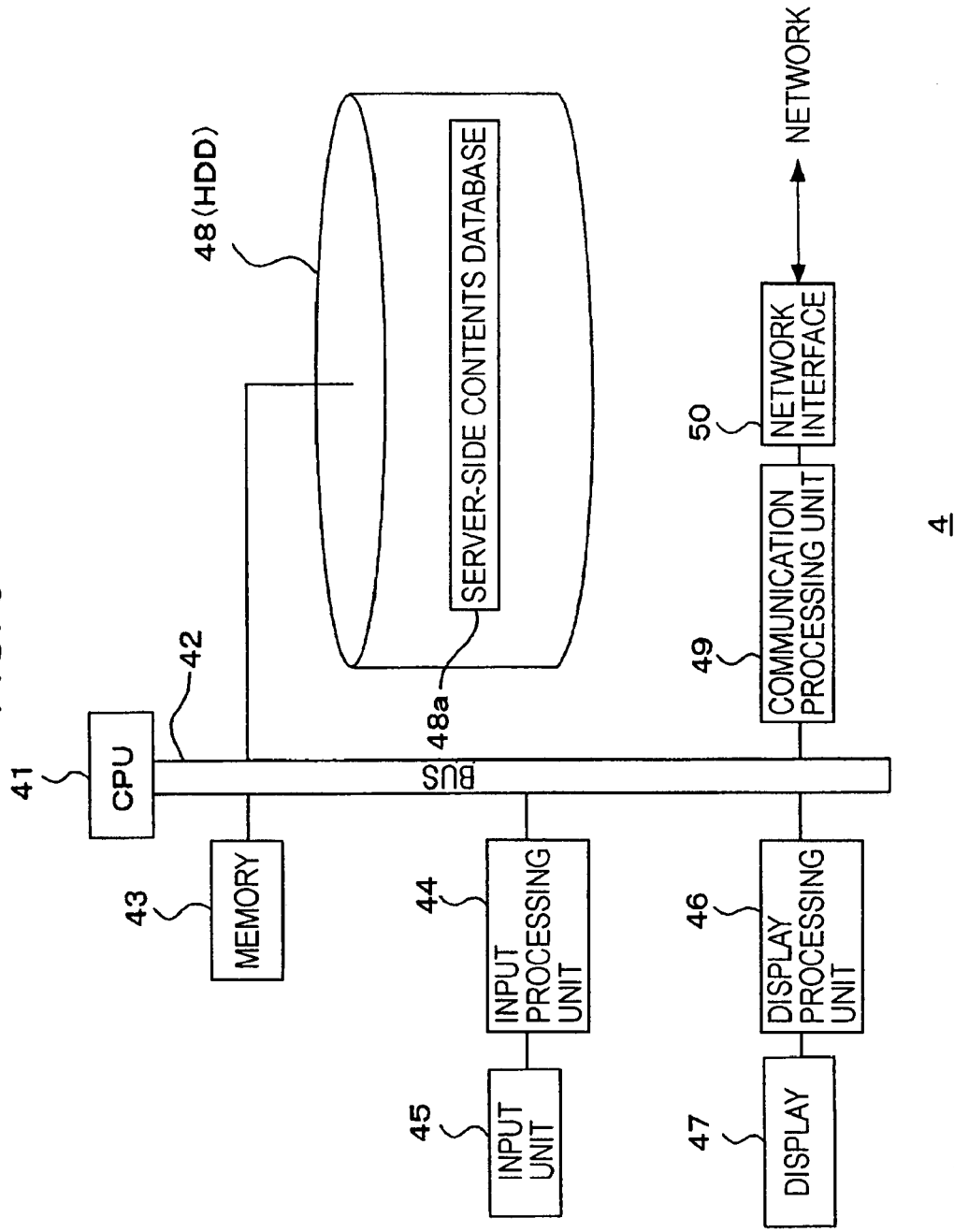
FIG. 3 is a block diagram illustrating the internal configuration of a server device according to an embodiment.

Next, the block diagram in FIG. 3 illustrates the internal configuration of the server device 4 illustrated in FIG. 1.

In FIG. 3, first a CPU 41 performs the entire control of the relevant server device 4, and calculation processing base on a program activated. For example, the CPU 41 performs operations corresponding to input to an input unit 45 shown in the drawing, storing of a data file in an HDD 48, creation or update of management information, and so forth. Also, the CPU 41 exchanges a control signal or data with each of the units via a bus 42 shown in the drawing.

A memory unit 43 integrally represents ROM, RAM, flash memory, and so forth which the CPU 41 employs for processing. The operation program of the CPU 41, program loader, and the like are stored in the ROM of the memory unit 43. Also, various types of operation coefficients, the parameters employed by the program, and so forth are stored in the above flash memory, and a data region and a task region which are necessary for executing the program are secured in the RAM temporarily.

Storing of a data file, creation and update of management information, and so forth are performed at the HDD 48 based on the control of the CPU 41.

Particularly, in this case, a server-side contents database 48a is stored in the HDD 48, as shown in the drawing.

The contents (music data file) to be distributed to the portable playback device 2 and the additional information thereof are stored in the server-side contents database 48a in a correlated manner.

Now, FIG. 4 illustrates the data structure of the above server-side contents database 48a.

In FIG. 4, as for the server-side contents database 48a, as to a music (composition) data file serving as contents, information of the title, genre, artist, year of release, of the composition thereof is correlated as the additional information thereof. Particularly, in the case of the present embodiment, tempo information is further correlated therewith as additional information.

Let us say that this tempo information is information representing the tempo of each composition, and specifically, is information serving as BPM wherein the tempo of the composition thereof is averaged in increments of minute. An arrangement is made wherein such tempo information serving as BPM is obtained beforehand by performing audio analysis regarding each composition, and then an operator or the like inputs this to the server device 4 or the like manually, thereby storing this in the server-side contents database 48a. Alternatively, an arrangement may be made wherein the server device 4 is provided with an audio analysis function, and upon a music data file being recorded in the server device 4, the music data file thereof is automatically played, the tempo information thereof is detected, and further the detected tempo information is automatically added to the server-side contents database 48a.

Note that with the server-side contents database 48a, of the additional information appended to contents data, the additional information other than the tempo information is referred to as attribute information which means information representing the attributes of contents.

As for the attribute information, various types of attribute information other than the above title, genre, artist, and year of release can be conceived, for example, information such as a composition writer and a composer, the album name and single name such as CD in which the composition thereof is recorded can be employed.

Also, with regard to such a server-side contents database 48a as well, actually for example, correlation between each of the contents and the additional information thereof is performed with the contents management information recorded in the HDD 48 or the like.

Now, description will return to FIG. 3. The input unit 45 is assumed to be an input device such as an unshown keyboard, mouse, remote commander, or the like. It is assumed for an operator or the like at the side running a service to perform various types of operation input or data input as to the input unit 45.

The information input from the input unit 45 is subjected to predetermined processing at an input processing unit 44, and is propagated to the CPU 41 as operation or data input. Subsequently, in response to the input information, the CPU 41 performs necessary calculation or control.

A display 47 is a liquid crystal display for example, and performs various types of display as to the operator or the like. For example, upon the CPU 41 supplying display information to a display processing unit 46 in accordance with various types of operation status, input status, and communication status, the display processing unit 46 displays and drives the display 47 based on the supplied display data, thereby performing display output regarding various types of information.

A communication processing unit 49 performs encoding processing of transmission data, or decoding processing of received data based on the control of the CPU 41.

A network interface 50 transmits the transmission data encoded at the above communication processing unit 49 to predetermined equipment (particularly, portable playback device 2 connected to network 3 via a predetermined transponder) via the network 3. Also, the network interface 50 delivers the signal transmitted from external equipment such as the portable playback device 2 via the network 3 to the communication processing unit 49. The communication processing unit 49 transfers the received information to the CPU 41.

<Operations of the First Embodiment>

Incidentally, as described above, in recent years, portable audio players are being used to enjoy music contents while performing physical exercise such as walking, jogging, dancing, or the like. Particularly, using portable audio players in such a manner in recent years has led to needs for playing the music suitable for the tempo of exercise has been increased. This means that the music matching the tempo of physical exercise is played.

Under the present circumstances, thus, in the event of playing the music corresponding to an exercise tempo, it is necessary for a user to select the composition having a tempo suitable for an exercise tempo that the user performs beforehand, and register this as a playlist or the like, following which it is necessary for the user to follow the procedure such as starting exercise such as walking, jogging, or the like after starting playback regarding this registered playlist.

However, in order to manually select the composition corresponding to an exercise tempo as described above, it is necessary for the user to search an exercise tempo by himself/ herself, and then look for the composition matching the tempo thereof while trying listening to the composition for example, which takes too much time and effort. Thus, such time-consuming work becomes an obstacle when enjoying the composition matching an exercise tempo freely in that it is necessary for the user to perform such work beforehand before starting exercise as described above.

Therefore, with the present embodiment, an arrangement is made wherein the exercise tempo of the user is automatically detected, and the composition having the tempo thereof is automatically selected and played.

As a specific configuration for realizing the above arrangement, the portable playback device 2 is provided with, as described with FIG. 2, a configuration for measuring an exercise tempo (in this case, the acceleration sensor 24 and the walking tempo measuring unit 25). Additionally, the CPU 21 of the portable playback device 2 is provided with functions serving as various types of functional sections such as illustrated in the following FIG. 5.

Figure 5:
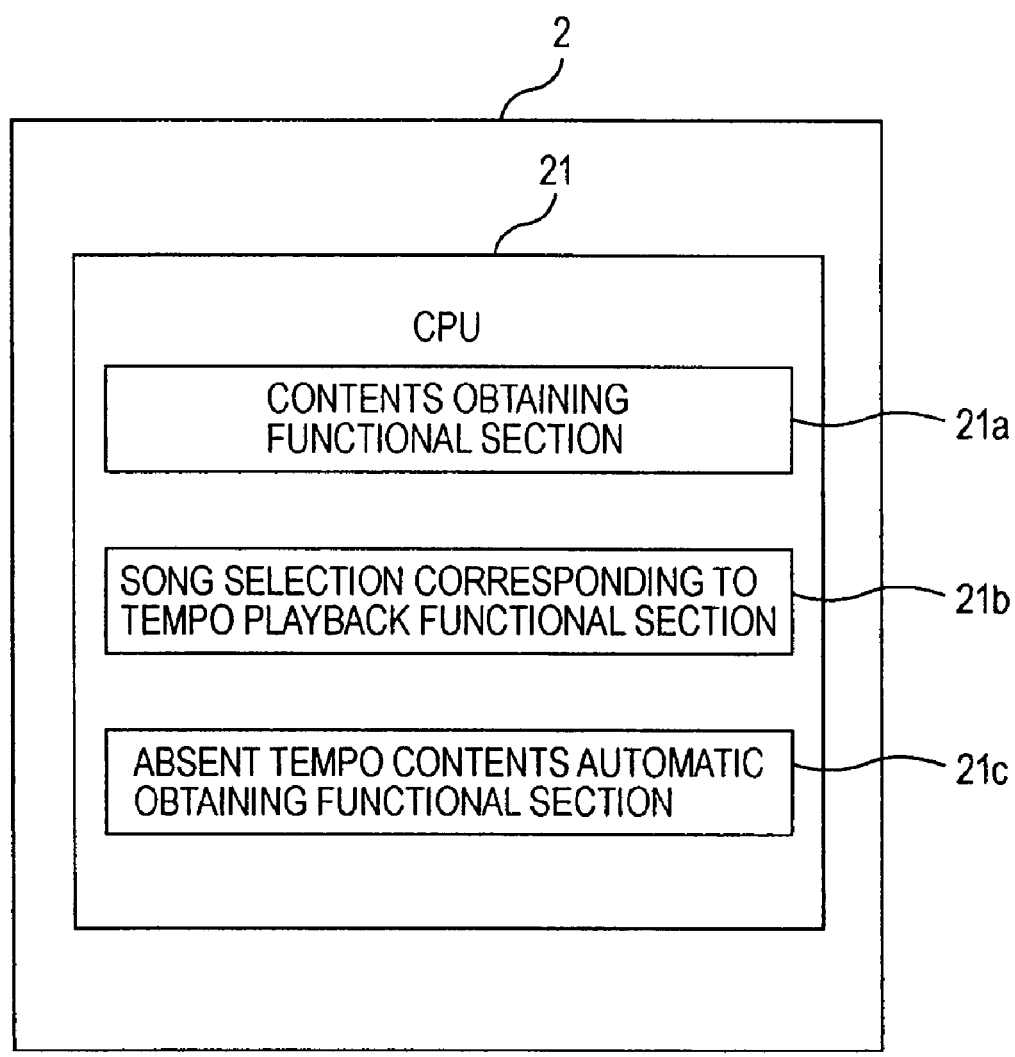
FIG. 5 is a diagram illustrating various types of functional sections provided for realizing the operations of the playback device according to the first embodiment.

FIG. 5 illustrates various types of functions realized by the processing operations of the CPU 21 in the portable playback device 2 as a functional block.

First, the CPU 21 is provided with functional sections serving as a contents obtaining functional section 21a and a composition-selection-corresponding-to-tempo playback functional section 21b.

The contents obtaining functional section 21a is a functional section for performing control for obtaining contents and the additional information thereof from the server device 4, and generating a playback-device-side contents database 34a. Specifically, as described in FIG. 1 as well, of contents which is accessed to a predetermined distribution site, and is stored in the server-side contents database 48a in the server device 4, the contents obtaining functional section 21a performs control for downloading the selected contents and the additional information thereof. Moreover, the contents obtaining functional section 21a controls the HDD 34 to record the downloaded contents and additional information thereof in a correlated manner, thereby generating a playback-device-side contents database 34a.

Note that technology has been known wherein thus, a predetermined site is accessed over the network, and the contents and additional information thereof to be stored in the server are obtained, and these are recorded in a correlated manner, thereby generating a contents database, so description regarding the specific processing thereof will be omitted.

According to the control of the contents obtaining functional section 21a, with the portable playback device 2, a playback-device-side contents database 34a in which the contents and additional information thereof obtained from the server device 4 side are correlated with each other is generated.

Here, as described in FIG. 4, with the present example, tempo information is also stored in a correlated manner as the additional information at the server-side contents database 48a side. Specifically, as described above, the contents obtaining functional section 21a also downloads the additional information, and records this in a correlated manner with contents, whereby the playback-device-side contents database 34a can also have the same data structure as FIG. 4. In other words, with the playback-device-side contents database 34a as well, the tempo information thereof is stored in each of contents in a correlated manner.

The above composition-selection-corresponding-to-tempo playback functional section 21b is a functional section for searching contents from the playback-device-side contents database 34a based on the tempo information measured at the walking tempo measuring unit 25, selecting the searched contents as playback objects, and then performing control so as to perform playback regarding the contents thereof.

Now, as a premise, with the present embodiment, when the user plays the composition corresponding to an exercise tempo at the portable playback device 2, the playback mode of the portable playback device 2 is switched from a normal playback mode to a composition selection corresponding to tempo playback mode. Subsequently, following switchover to the composition selection corresponding to tempo playback mode being thus performed, physical exercise is started.

Based on such a premise, first, the composition-selection-corresponding-to-tempo playback functional section 21b stands by until predetermined operation input for switchover to the composition selection corresponding to tempo playback mode as described above is performed.

Subsequently, in response to the switchover operation input to the composition selection corresponding to tempo playback mode serving as predetermined operation input, first the composition-selection-corresponding-to-tempo playback functional section 21b controls the walking tempo measuring unit 25 to start measuring of a walking tempo, and obtains the information of the walking tempo of the user.

Further, upon obtaining the information of the walking tempo, the composition-selection-corresponding-to-tempo playback functional section 21b searches contents from the playback-device-side contents database 34a based on the information of the obtained walking tempo, and creates a playlist using the searched contents.

Specifically, in this case, of the contents (music data files) stored in the playback-device-side contents database 34a, the composition-selection-corresponding-to-tempo playback functional section 21b searches the music data file correlated with the tempo information having the same numerical value of the BPM as the numerical value of the BPM serving as the information of the measured walking tempo. Following the search, the composition-selection-corresponding-to-tempo playback functional section 21b creates a playlist wherein the contents thus searched becomes playback objects. In other words, the composition-selection-corresponding-to-tempo playback functional section 21b selects the compositions thus searched as playback objects.

Subsequently, upon a playlist being thus created, the composition-selection-corresponding-to-tempo playback functional section 21b performs control so as to perform playback of contents based on this playlist. Specifically, the composition-selection-corresponding-to-tempo playback functional section 21b controls the recording/playback unit 31 to perform playback regarding the music data files listed on the playlist.

Thus, the compositions having the same tempo as the walking tempo of the user become the compositions to be played.

Thus, according to the portable playback device 2 of the present embodiment, an exercise tempo is automatically measured, and the contents having the same tempo as the measured exercise tempo is automatically selected and played.

Thus, time and effort for the user searching his/her exercise tempo beforehand, and further time and effort for the user manually selecting the contents having the same tempo as the exercise tempo can be reduced, thereby allowing the user to enjoy the composition corresponding to his/her exercise tempo freely.

Incidentally, the above description is premised on the contents having the same tempo as the user's walk tempo existing within the terminal-side database 34a, but a case can be conceived wherein determination is made that there are no contents having the same tempo as such a walking tempo within the database 34a, resulting in a search result wherein there are no relevant contents.

Therefore, the CPU 21 is further provided with a function serving as the absent tempo contents automatic obtaining functional section 21c illustrated in FIG. 5.

This absent tempo contents automatic obtaining functional section 21c is a functional section for performing control for obtaining the relevant contents from the server device 4 side in the event that determination is made that there are no relevant contents within the playback-device-side contents database 34a.

Specifically, in the event that determination is made that there are no relevant contents within the playback-device-side contents database 34a, the absent tempo contents automatic obtaining functional section 21c performs control so as to send the contents distribution request specifying the tempo information measured by the walking tempo measuring unit 25 to the server device 4 side.

In response to this distribution request, the server device 4 searches contents from the server-side contents database 48a based on the tempo information specified by the distribution request. In this case, the server device 4 also searches the contents correlated with the tempo information having the same numerical value as the numerical value of the BPM serving as the specified tempo information.

Subsequently, the server device 4 transmits the searched contents and additional information thereof to the portable playback device 2.

Note that the server device 4 is the contents distribution side in the contents distribution service, so is configured so as to store a great number of contents. The following description will be continued assuming that all of the compositions having a tempo assumed as one of the user's exercise tempos are stored in the server-side contents database 48a from the perspective of the properties of such a server device 4.

Upon receiving the relevant contents and additional information thereof thus transmitted from the server device 4 side, the absent tempo contents automatic obtaining functional section 21c first performs control so as to save the received contents and additional information thereof in the playback-device-side contents database 34a. Specifically, the absent tempo contents automatic obtaining functional section 21c controls the recording/playback unit 31 to record the received contents (music data file) and additional information thereof in the HDD 34 in a correlated manner.

Additionally, the absent tempo contents automatic obtaining functional section 21c creates a playlist using the contents thus saved, and performs control so as to perform playback based on this playlist. In other words, the absent tempo contents automatic obtaining functional section 21c creates a playlist wherein the contents (music data file) saved as described above are playback objects. Moreover, the absent tempo contents automatic obtaining functional section 21c controls the recording/playback unit 31 to perform playback regarding the music data files listed on the playlist.

According to such operations, in the event that determination is made that there are no contents having a tempo corresponding to the walk tempo information at the portable playback device 2 side, the absent tempo contents automatic obtaining functional section 21c can obtain the relevant contents from the server device 4 side. Also, additionally, the portable playback device 2 can select the obtained contents as playback objects, and perform playback regarding the selected contents.

Thus, even in the event that there, are no contents having the same tempo as the user's exercise tempo at the portable playback device 2 side, the user is released from time and effort such as manually downloading the relevant contents from the server device 4 side, thereby allowing the user to enjoy the composition corresponding to his/her exercise tempo freely.

Also, further in this case, with the absent tempo contents automatic obtaining functional section 21c, a case in which connection with the server device 4 side could not be established due to electromagnetic interference for example is taken into consideration, and an arrangement is made wherein in a case in which determination is made that connection with the server device 4 is impossible, at predetermined timing thereafter, a distribution request specifying reconnection processing and the measured tempo information is performed. In other words, an arrangement is made wherein in such a case, retry processing is performed.

For example, in this case, as for the retry processing, an arrangement is made wherein following predetermined standby time, a distribution request specifying reconnection processing and the measured tempo information is performed.

Such a retry function regarding obtaining of an absent tempo contents is provided, whereby the relevant contents can be obtained in a sure manner even if determination is made that connection with the server device 4 is temporarily impossible due to electromagnetic interference for example.

<Processing Operations>

Next, description will be made regarding the processing operations to be performed for realizing the operations of the contents distribution system 1 according to the above first embodiment with reference to the following flowcharts in FIGS. 6 and 7.

Figure 6:
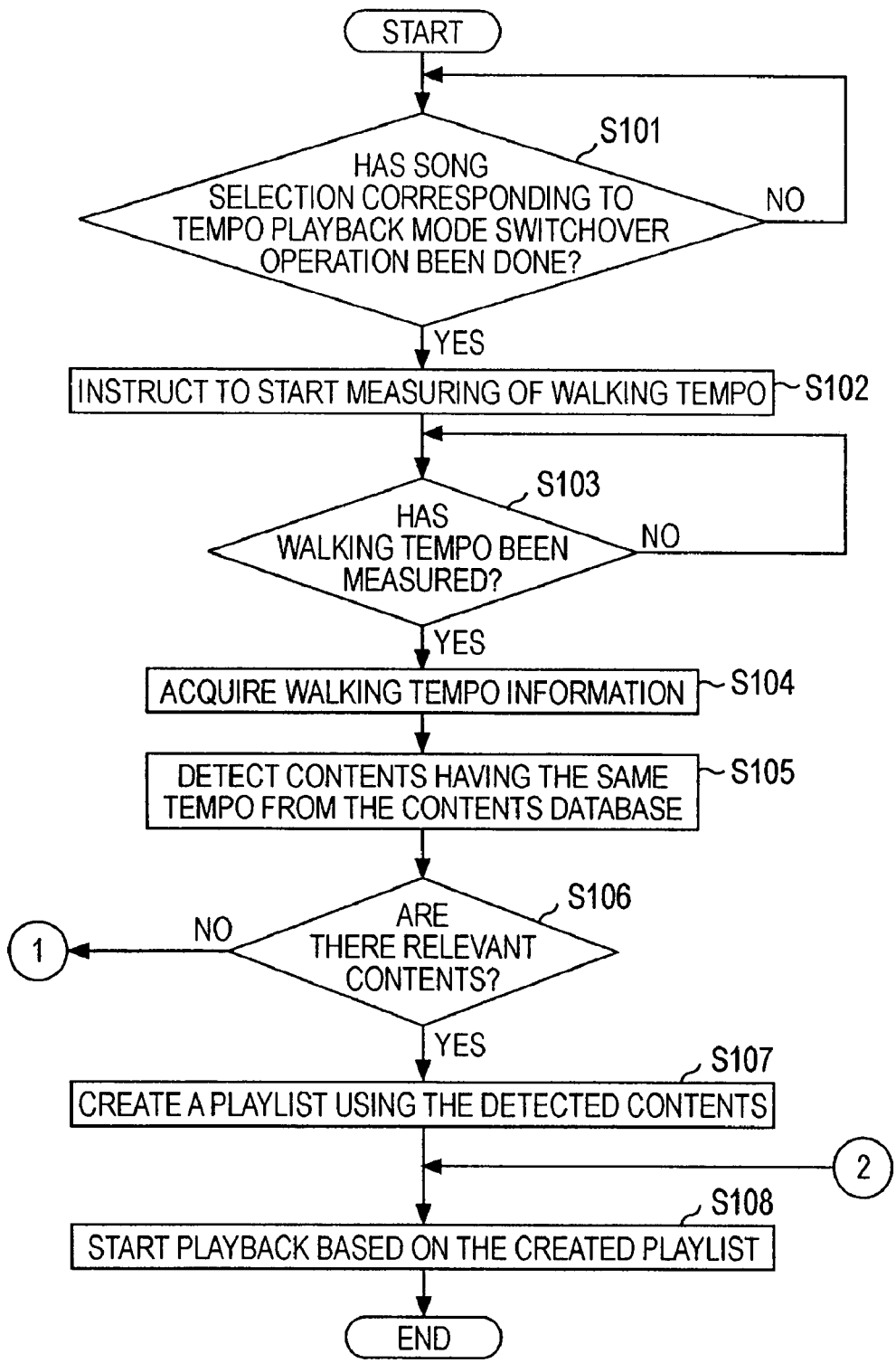
FIG. 6 is a flowchart illustrating processing operations to be performed principally for realizing the operations of a composition selection corresponding to tempo playback function as processing operations to be executed for realizing the operations according to the first embodiment.
Figure 7:
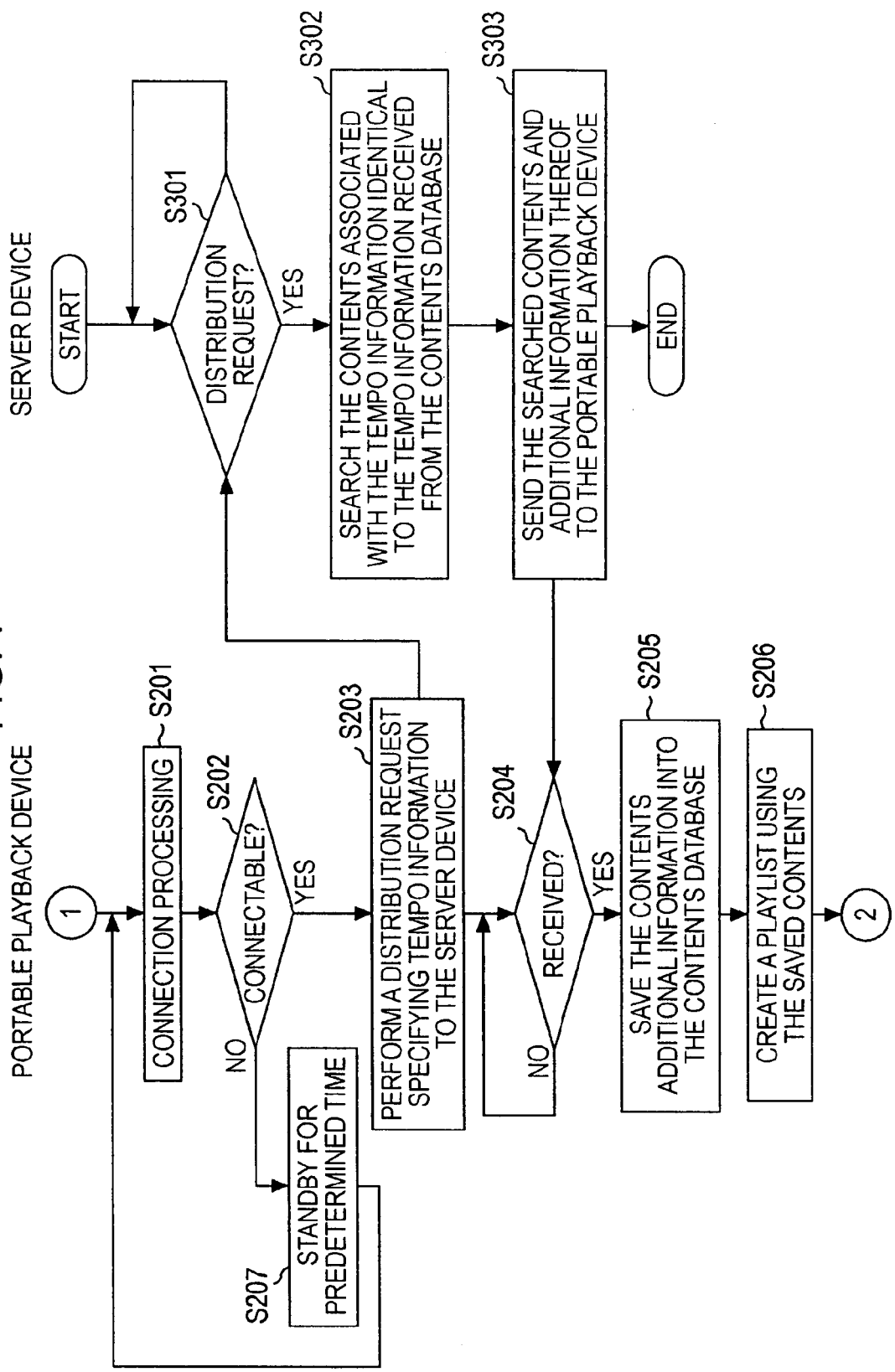
FIG. 7 is a flowchart illustrating processing operations to be performed principally for realizing the operations of an absent tempo contents automatic obtaining function as processing operations to be executed for realizing the operations according to the first embodiment.

In these drawings, FIG. 6 illustrates the processing operations to be performed at the portable playback device 2 side for realizing the functions serving as the tempo playback functional section 21b described in the above FIG. 5, and FIG. 7 illustrates the processing operations to be performed at the portable playback device 2 side for realizing the functions serving as the absent tempo contents automatic obtaining functional section 21c, and the processing operations to be performed at the server device 4 in response thereto.

Note that in these drawings, the processing operations illustrated as the portable playback device 2 side are executed by the CPU 21 illustrated in FIG. 2 in accordance with the program stored in the ROM 22 for example, and also the processing operations at the server device 4 side are executed by the CPU 41 illustrated in FIG. 3 based on the program stored in the ROM of the memory unit 23 for example.

First, in FIG. 6, the CPU 21 stands by until the switchover operation to the composition selection corresponding to tempo playback mode is performed in step S101 shown in the drawing. Specifically, as described above as well, the CPU 21 stands by until predetermined operation input serving as the switchover operation to the composition selection corresponding to tempo playback mode is performed.

Subsequently, in the event that determination is made that the switchover operation to the composition selection corresponding to tempo playback mode has been performed, in step S102 the CPU 21 performs a walking tempo measuring instruction, and controls the walking tempo measuring unit 25 to start measuring of a walking tempo.

Further, in step S103, the CPU 21 stands by until the walking tempo is measured. In other words, as described in FIG. 1 as well, measuring of walking tempo in this case needs predetermined time, so the CPU 21 stands by until the predetermined time has elapsed.

In the event that walking tempo information has been measured, in the next step S104 the CPU 21 obtains the walking tempo information supplied from the walking tempo measuring unit 25.

Upon the walking tempo information being obtained, in step S105 the CPU 21 searches the contents whose tempo matching the obtained walking tempo from the contents database. Specifically, of the contents stored in the playback-device-side contents database 34a, in this case the CPU 21 searches the contents correlated with the tempo information whose numerical value is the same as that of the measured tempo information.

In the subsequent step S106, the CPU 21 performs determination processing regarding whether or not there have been the relevant contents. In step S106, in the event that the negative result has been obtained wherein there have no contents having the same tempo information as the relevant contents, the CPU 21 proceeds to processing for realizing the absent tempo contents automatic obtaining function illustrated in later-described FIG. 7.

Also, in step S106 in the event that the positive result has been obtained wherein there have been the relevant contents, the flow proceeds to step S107, where the CPU 21 creates a playlist using the searched contents. That is to say, the CPU 21 creates a playlist in which the searched contents are playback objects.

In the subsequent step S108, the CPU 21 executes processing for starting playback based on the created playlist. Specifically, the CPU 21 controls the recording/playback unit 31 to perform playback regarding the music data files listed on the playlist.

Thus, playback of the compositions having the same tempo as the user's walking tempo is started.

Next, description will be made with reference to FIG. 7 regarding the processing operations at the portable playback device 2 side to be executed for realizing the absent tempo contents automatic obtaining function, and the processing operations to be executed at the server device 4 side in response thereto.

First, with the portable playback device 2 side, in the event that the negative result has been obtained in the previous step S106, the flow proceeds to the processing in step S201 shown in FIG. 7.

In this step S201, first, the CPU 21 executes connection processing. That is to say, specifically, the CPU 21 executes control for establishing connection with the transponder (not shown) connected to the network 3 described in FIG. 1 as control as to the communication unit 29. Subsequently, in the event that connection with the transponder has been established, the CPU 21 performs control for establishing connection with the server device 4 connected thereto via the network 3.

In step S202, the CPU 21 performs determination processing regarding whether or not connection is impossible. Specifically, the CPU 21 determines regarding whether or not connection to the network 3 and connection to the server device 4 have been established according to the connection processing in the above step S201.

In the event that the negative result has been obtained wherein the connections have not been established, as shown in the drawing, the flow proceeds to step S207, where following predetermined time standby, the flow returns to step S201, where the CPU 21 executes the connection processing again. In other words, thus, the retry function described in FIG. 5 is realized.

Also, in the above step S202 in the event that the positive result has been obtained wherein the connections have been established, in step S203 the CPU 21 sends a distribution request specifying the tempo information to the server device 4. Specifically, the CPU 21 controls the communication unit 29 to perform a contents distribution request including the walking tempo information obtained in the previous step S104.

With the server device 4 side, the CPU 41 stands by in step S301 until the above distribution request is received. Subsequently, in the event of receiving the distribution request, in step S302 the CPU 41 searches the contents correlated with the tempo information matching the received tempo information from the contents database. Specifically, the CPU 41 searches, based on the tempo information specified by the received distribution request, the contents correlated with the tempo information having the same numerical value as the tempo information thereof from the server-side contents database 48a.

Subsequently, in step S303, the CPU 41 executes processing for transmitting the searched contents and additional information thereof to the portable playback device 2. Specifically, the CPU 41 controls the communication processing unit 49 to transmit the searched contents and additional information thereof to the portable playback device 2 via the network 3.

With the portable playback device 2 side, the CPU 21 stands by in step S204 until the contents and additional information thereof transmitted from the server device 4 side are received. Subsequently, upon receiving the information at the communication unit 29, in step S205 the CPU 21 first performs control so as to save the received contents and additional information thereof in the playback-device-side contents database 34a. Specifically, the CPU 21 controls the recording/playback unit 31 to record the received contents (music data file) and additional information thereof in the HDD 34 in a correlated manner.

Additionally, in step S206, the CPU 21 creates a playlist using the contents thus saved. Subsequently, upon executing the processing in step S206, the flow proceeds to step S108 described in FIG. 6, where the CPU 21 executes the processing for starting playback based on the created playlist.

Thus, playback of the compositions having the same tempo as the user's walking tempo is started.

Second Embodiment

<System Overview>

Next, description will be made regarding a second embodiment.

Figure 8:
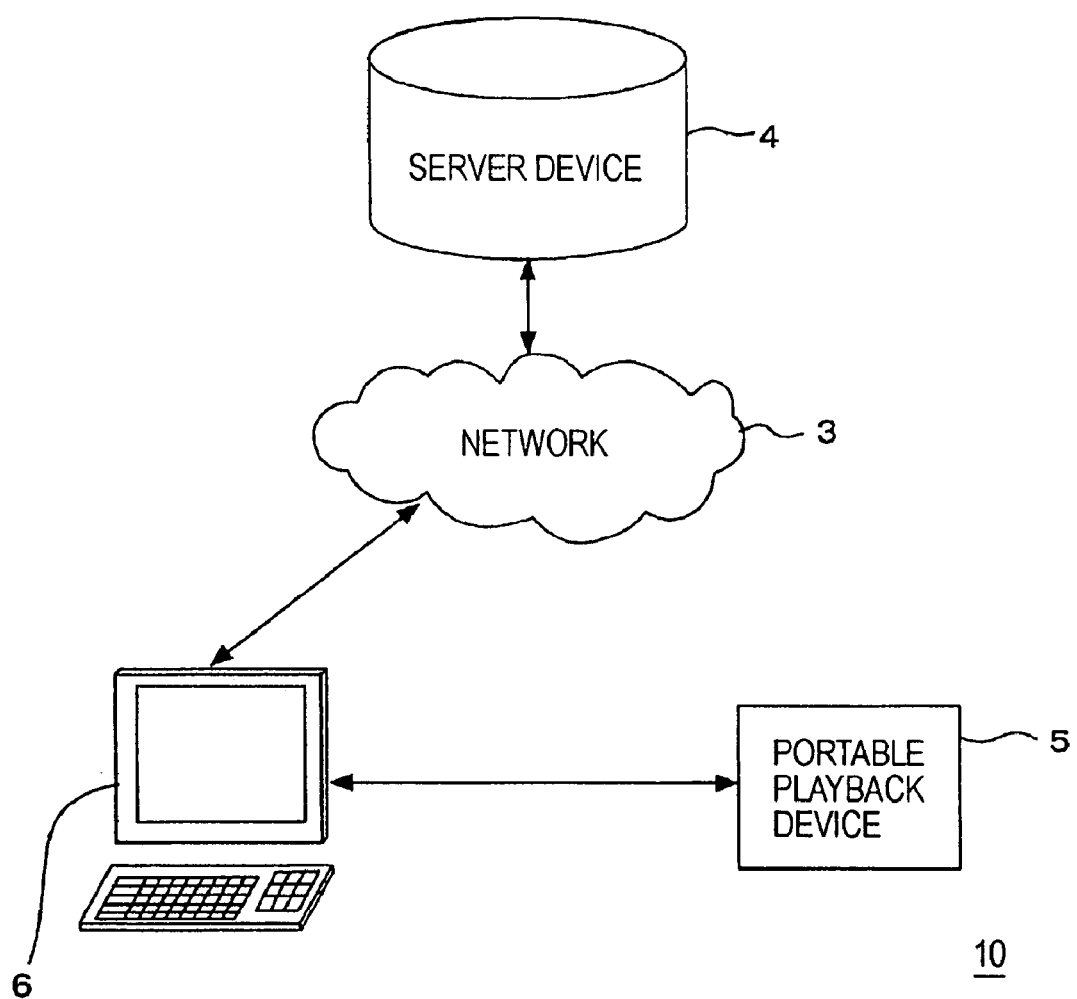
FIG. 8 is a diagram for describing the outline of a contents distribution system according to a second embodiment of the present invention.

FIG. 8 is a diagram for describing the overview of a contents distribution system 10 according to the second embodiment. In FIG. 8, the contents distribution system 10 according to the second embodiment includes, as illustrated in the drawing, at least a portable playback device 5, a personal computer 6, and a server device 4. In this case, the portable playback device 5 is equivalent to the playback device mentioned at the present invention, and the server device 4 is equivalent to the server device mentioned at the present invention. Also, the personal computer 6 is equivalent to the information processing device mentioned at the present invention.

In the case of the second embodiment, as for the portable playback device 5, equipment having no connection function as to the network 3, which is different from the earlier-described portable playback device 2, is assumed. However, the portable playback device 5 in this case includes communication means for performing data communication with the personal computer 6, and an arrangement is made wherein the user downloads contents (and additional information thereof) from a PC-side contents database (later-described PC-side contents database 68a) stored in the personal computer 6 to the portable playback device 5.

Also, in this case, the above PC-side contents database in the personal computer 6 is made up of the contents and additional information thereof downloaded from the server device 4 (predetermined distribution site). Moreover, the contents stored in a medium such as CD (Compact Disc) or the like are acquired (so-called ripping), and this can be also added to the above PC-side contents database.

Note that with regard to the contents thus subjected to ripping from a medium such as CD or the like, additional information such as a title name and the like is not appended in some cases. In such a case, as widely performed under the present circumstances, an arrangement is made wherein the relevant additional information is downloaded from a predetermined database storing the additional information regarding the compositions released in the past such as CDDB (CD DataBase) and the like present over the network 3, i.e., the Internet.

Also, in the case of the present embodiment, it is necessary to provide tempo information as additional information, but when obtaining the tempo information regarding the contents subjected to ripping by the personal computer 6 as described above, an arrangement may be made wherein tempo information is also stored in a database such as the above CDDB as additional information beforehand, and then this tempo information is obtained from the database, for example.

Alternatively, an arrangement may be made wherein the personal computer 6 is provided with an audio analysis function, and the contents subjected to ripping is subjected to audio analysis to automatically obtain tempo information.

Also, an arrangement may be made wherein the obtained other additional information (attribute information) regarding the contents thus subjected to ripping is transmitted to the server device 4 to inquire about the relevant tempo information, and the tempo information of the contents thereof is obtained from the server device 4 side.

Note that various type of technology for obtaining tempo information as the additional information of the contents thus subjected to ripping at the personal computer 6 can be conceived. Now, a case wherein tempo information is stored in a database such as CDDB over the network 3 as additional information will be described as an example. That is to say, with the personal computer 6 in this case, as currently performed, the additional information regarding the contents subjected to ripping is obtained from a predetermined database over the network, whereby the tempo information thereof can be also obtained.

Now, an arrangement is made wherein various types of processing such as downloading of contents and additional information thereof from the server device 4 side as described above, obtaining of the additional information from over the network regarding the contents subjected to ripping, generation of a PC-side contents database in which contents and additional information are correlated with each other, downloading contents and additional information thereof to the portable playback device 5, and the like are performed by dedicated applications (hereafter, referred to as contents management applications) installed in the personal computer 6 beforehand.

Note that programs serving as such contents management applications for realizing the above various types of processing have been known, and accordingly, the detailed description thereof will be omitted here.

With the second embodiment, the user of the portable playback device 2 is also assumed to be the user of the personal computer 6. Operationally, the user first causes the personal computer 6 in which the above contents management applications are installed to perform downloading of contents and additional information thereof from the server device 4, or taking in contents and additional information thereof by ripping. Thus, the above PC-side contents database is first formed. Additionally, the portable playback device 5 is connected to the personal computer 6 via a USB cable for example, whereby enabling the contents and additional information thereof stored in the personal computer 6 side to be downloaded to the portable playback device 5. Consequently, the user can play and enjoy the contents thus downloaded to the portable playback device 5.

Also, the present embodiment allows the user to select regarding whether or not automatic synchronizing processing is performed as setting regarding the download processing from the personal computer 6 to the portable playback device 5 using the above contents management application. Specifically, for example, in response to a situation in which the personal computer 6 and the portable playback device 5 are connected in a data-communicable state, the user can selectively set regarding whether or not processing for synchronizing the contents of the PC-side contents database and the contents of the playback-device-side contents database 34a is performed.

Note that under such a setting that automatic synchronizing processing is not performed, the user is allowed to download arbitrarily selected contents and additional information thereof from the PC-side contents database to the portable playback device 5.

Note that with the second embodiment, the configuration of the server device 4 is the same as that in the first embodiment, so description thereof will be omitted here. However, the processing operations in this case are different from the processing operations to be performed by the CPU 41, but this point will become clear with later description.

<Configuration of Playback Device>

Figure 9:
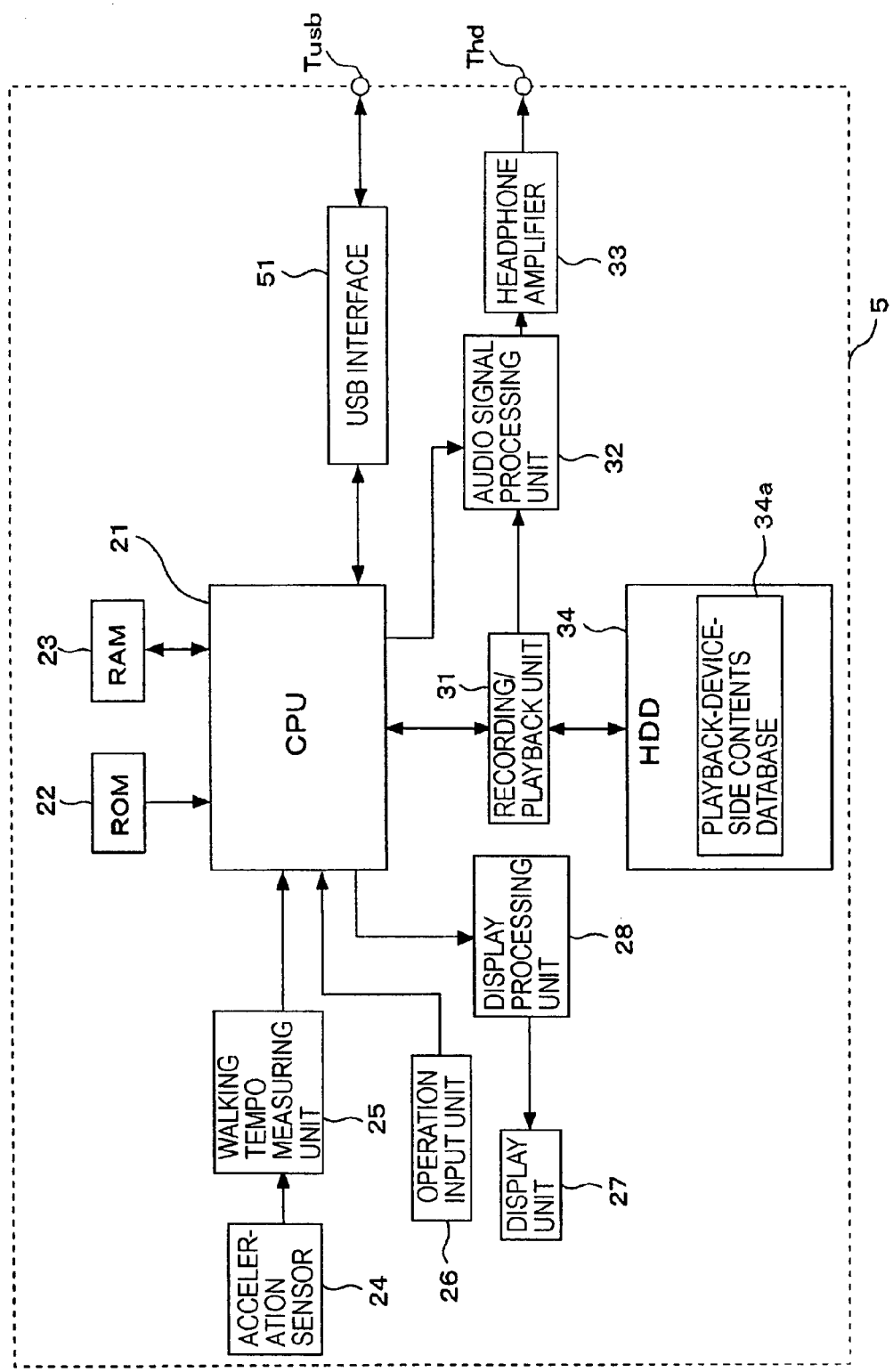
FIG. 9 is a block diagram illustrating the internal configuration of a playback device according to the second embodiment.

FIG. 9 is a block diagram illustrating the internal configuration of the portable playback device 5 according to the second embodiment illustrated in FIG. 8.

Note that in this drawing, the same components as those already described in FIG. 2 are appended with the same reference numerals, and description thereof will be omitted.

As described previously, the portable playback device 5 in this case becomes a modification of the portable playback device 2 in the case of the first embodiment from which the network connection function is omitted. Specifically, with the portable playback device 5 in this case, the communication unit 29 and the antenna 30 illustrated in FIG. 2 are omitted.

However, a USB (Universal Serial Bus) interface 51 is newly added to this portable playback device 5. In other words, this case is configured so as to perform data communication with the personal computer 6 illustrated in FIG. 1 in accordance with the USB communication standard.

As can be understood from the description in FIG. 8, contents (music data file) and additional information thereof and so forth from the personal computer 6 are received via this USB interface 51. The music data file and additional information thus received are recorded to the HDD 34 in a correlated manner by the control processing of the CPU 21 based on the instruction by the above contents management application at the personal computer 6 side. Thus, in other words, the playback-device-side contents database 34a shown in the drawing is formed in the HDD 34.

Note here that the USB interface has been employed as a communication interface between the personal computer 6 and the portable playback device 5, but the other interfaces such as IEEE (the Institute of Electrical and Electronic Engineers) 1394 or the like are employable as a communication interface between the personal computer 6 and the portable playback device 5. Alternatively, besides communication by a cable, wireless communications such as Bluetooth (a registered trademark) and so forth can be employed, for example.

<Configuration of Information Processing Device>

Figure 10:
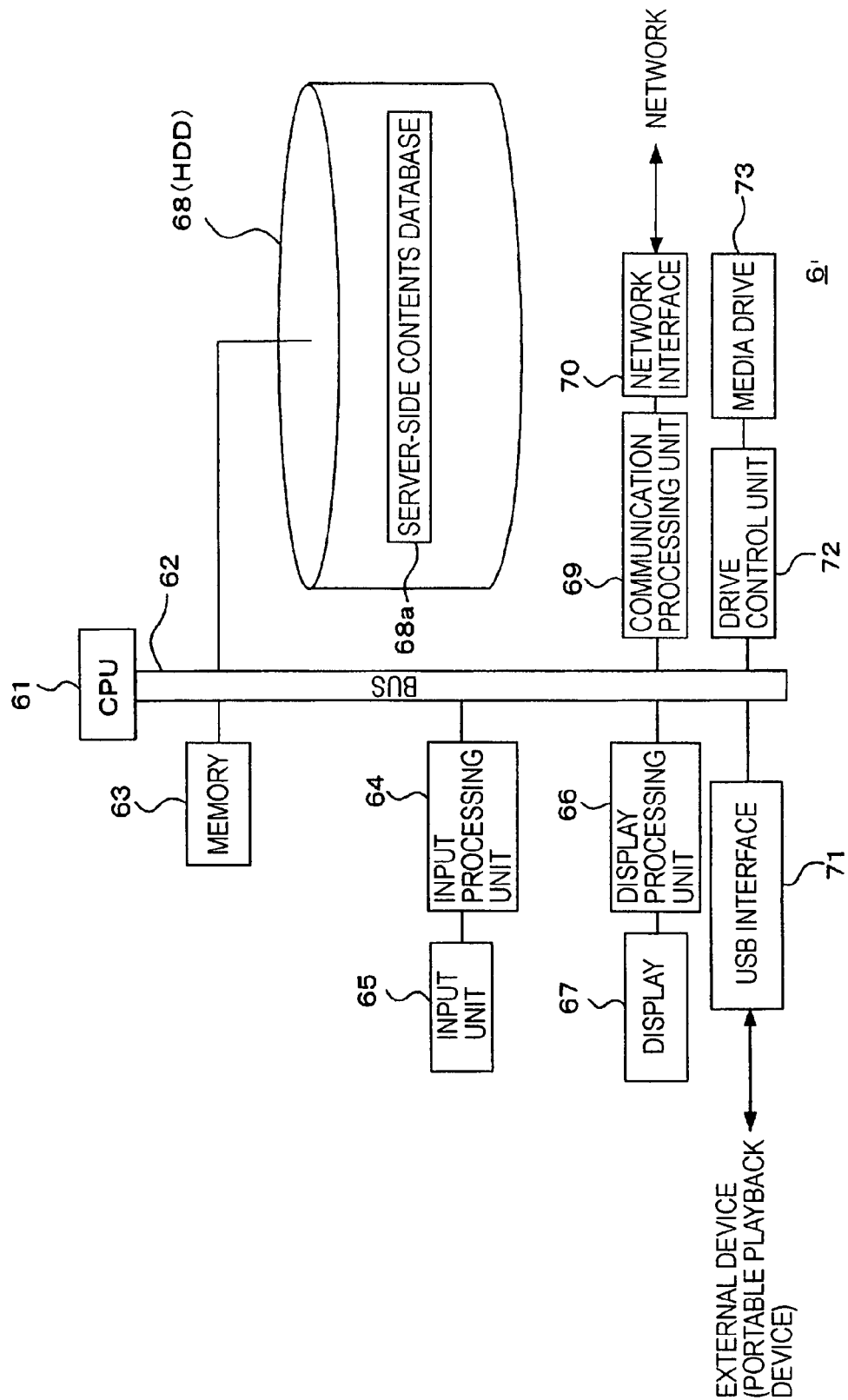
FIG. 10 is a block diagram illustrating the internal configuration of an information processing device according to the second embodiment.

FIG. 10 is a block diagram illustrating the internal configuration of the personal computer 6 illustrated in FIG. 8.

In FIG. 10, first a CPU 61 performs the entire control of the relevant personal computer 6, and calculation processing based on a program activated. For example, the CPU 61 performs operations corresponding to input to an input unit 65 shown in the drawing, storing of a data file in an HDD 68, creation or update of management information, and so forth. Also, the CPU 61 exchanges a control signal or data with each of the units via a bus 62 shown in the drawing.

A memory unit 63 integrally illustrates ROM, RAM, flash memory, and so forth which the CPU 61 employs for processing. The operation program of the CPU 61, program loader, and the like are stored in the ROM of the memory unit 63.

Particularly, in this case, such as described in FIG. 8, dedicated application programs (contents management application programs) for realizing various types of functions such as downloading regarding contents and additional information thereof, generation of a PC-side contents database 68a, and so forth are also stored therein. Note that such a contents management application program can be stored in the HDD 68.

Also, various types of operation coefficients, the parameters employed by the program, and so forth are stored in the above flash memory, and a data region and a task region which are necessary for executing the program are secured in the RAM temporarily.

Storing of a data file, creation and update of management information, and so forth are performed at the HDD 68 based on the control of the CPU 61.

Particularly, in this case, the PC-side contents database 68a is stored in the HDD 68, as shown in the drawing.

This PC-side contents database 68a is, as can be understood from the description in FIG. 8, formed by the contents and additional information downloaded from the server device 4, and the contents and additional information thereof taken in by ripping being correlated with each other.

It should be understood that the data structure of such a PC-side contents database 68a is also the same as that illustrated in FIG. 4. Specifically, attribute information (title, artist, genre, and year of release in this case) and tempo information serving as additional information are correlated with a music data file serving as contents data.

Also, with regard to such a PC-side contents database 68a as well, correlation between each of the contents and additional information is actually performed in accordance with the contents management information recorded in the HDD 68 or the like.

The input unit 65 is assumed to be an input device such as an unshown keyboard, mouse, remote commander, or the like. It is assumed for the user to perform various types of operation input or data input to this input unit 65.

The information input from the input unit 65 is subjected to predetermined processing at an input processing unit 64, and is propagated to the CPU 61 as operation or data input. Subsequently, in response to the input information, the CPU 61 performs necessary calculation or control.

A display 67 is a display such as a liquid crystal display for example, and performs various types of display as to the user. For example, upon the CPU 61 supplying display information to a display processing unit 66 in accordance with various types of operation status, input status, and communication status, the display processing unit 66 displays and drives the display 67 based on the supplied display data, thereby performing display output regarding various types of information.

A communication processing unit 69 performs encoding processing of transmission data, or decoding processing of received data based on the control of the CPU 61.

A network interface 70 transmits the transmission data encoded at the above communication processing unit 69 to predetermined equipment (particularly, server device 4 in this case) via the network 3. Also, the network interface 70 delivers the signal transmitted from external equipment such as the server device 4 to the communication processing unit 69 via the network 3.

The communication processing unit 69 transfers the received information to the CPU 61.

A USB interface 71 is provided for performing data communication with external equipment (particularly, portable playback device 5 in this case) connected thereto via a USB cable.

Also, the personal computer 6 is provided with a drive control unit 72 and a media drive 73 shown in the drawing.

The media drive 73 is a drive function unit corresponding to a necessary recording medium such as CD, MD (Mini Disc), CD-R (Recordable), CD-RW (ReWritable), DVD (Digital Versatile Disc), DVD-R, DVD-RW, a memory card (semiconductor memory device), and so forth, and is configured so as to perform recording/playback operations regarding these media. For example, in the event of handling disc media of CD system or DVD system serving as media, this media drive 3 is provided with an optical head, a spindle motor, a playback signal processing unit, a servo circuit, and so forth, for example.

The drive control unit 72 controls recording/playback operations, access operations, and so forth regarding a medium loaded in the media drive 73. For example, in the event that a playback instruction as to the loaded medium occurs, the CPU 61 instructs the drive control unit 72 to perform playback of the medium. In response to this instruction, the drive control unit 72 controls the media drive 73 to execute access operations or playback operations. The media drive 73 transmits the readout playback data to a bus 62 via the drive control unit 72.

These drive control unit 72 and media drive 73 are provided, thereby enabling contents to be acquired from a medium, which is the above ripping.

<Operations According to the Second Embodiment>

Figure 11:
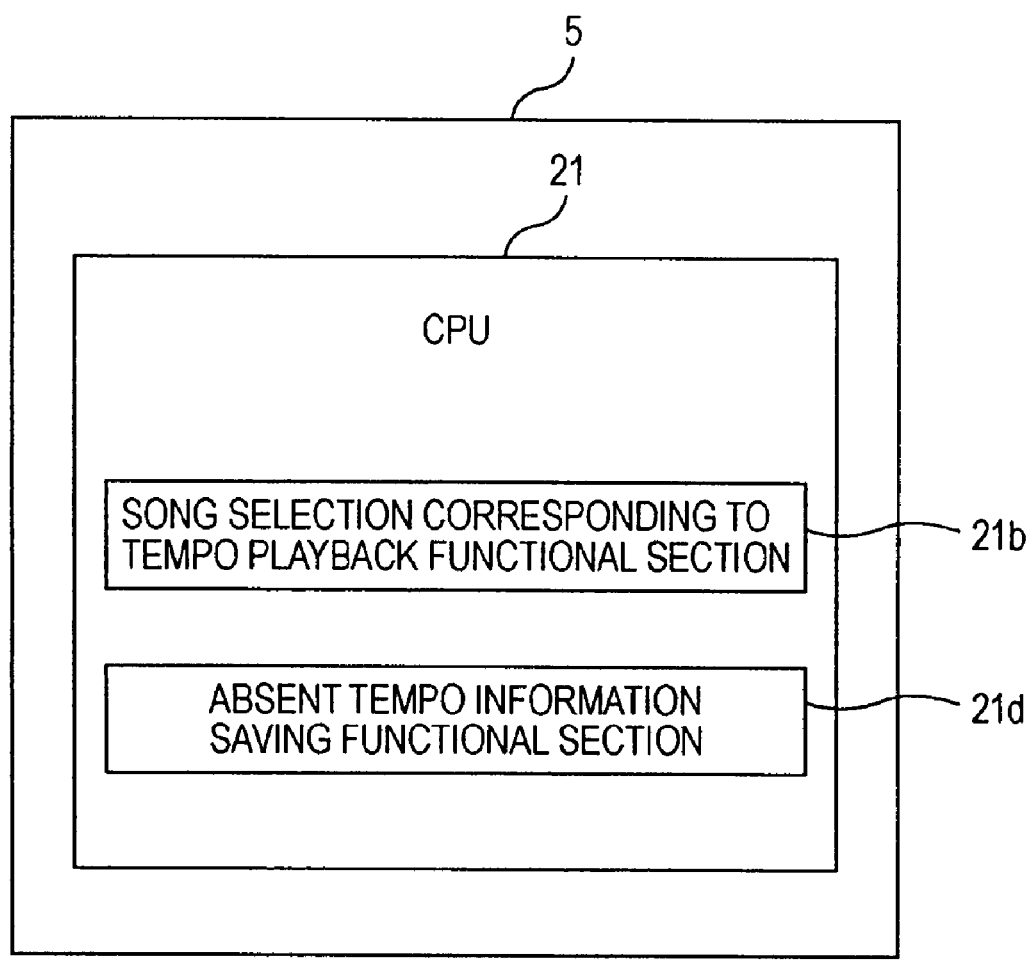
FIG. 11 is a diagram illustrating various types of functional sections provided for realizing the operations of the playback device according to the second embodiment.
Figure 12:
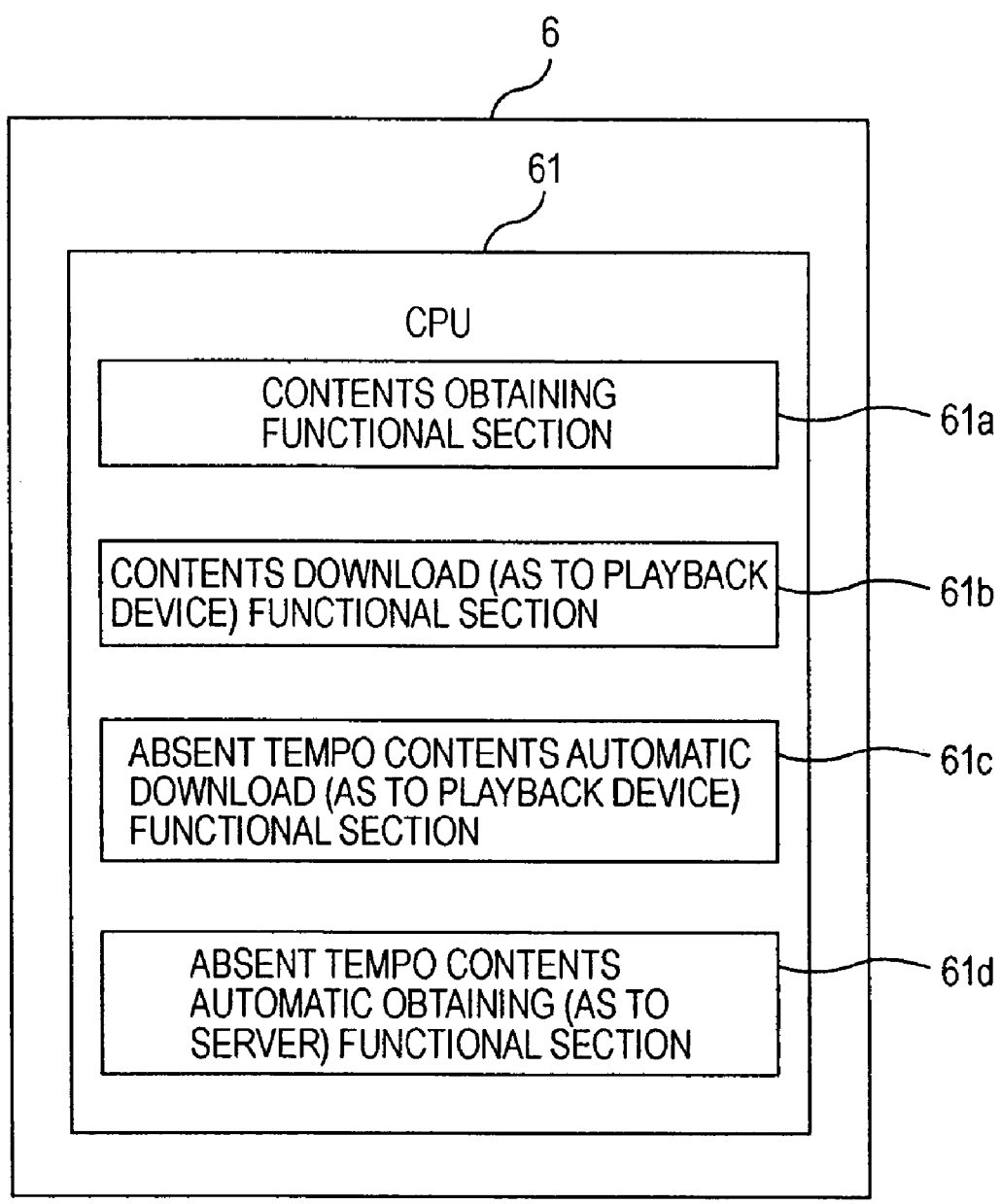
FIG. 12 is a diagram illustrating various types of functional sections provided for realizing the operations of the information processing device according to the second embodiment.

FIGS. 11 and 12 are diagrams for describing various types of functions realized by each of the processing operations of the CPU 21 of the portable playback device 5, and the CPU 61 of the personal computer 6 described above.

First, FIG. 11 illustrates the functions realized by the CPU 21 of the portable playback device 5.

In FIG. 11, the CPU 21 in this case is also provided with a composition-selection-corresponding-to-tempo playback functional section 21b. Specifically, with the portable playback device 5 according to the second embodiment as well, as with the case of the first embodiment, an arrangement is made wherein the composition having the same tempo as the user's exercise tempo can be automatically selected from the playback-device-side contents database 34a, and can be played.

Also, an absent temp information saving functional section 21*d* is, in the event that as a search result of contents by the composition-selection-corresponding-to-tempo playback functional section 21*b* determination is made that there are no contents having the same tempo as the exercise tempo in the playback-deice side contents database 34*a*, a functional section for saving the measured exercise tempo information as absent tempo information.

Specifically, the CPU 21 serving as the absent temp information saving functional section 21*d* performs, in the event that determination is made that there are no contents having the same tempo as the exercise tempo within the playback-deice side contents database 34*a* as described above, processing for recording the measured exercise tempo information as absent tempo information in a desired storing medium such as the HDD 34 for example.

Note that the absent tempo information is information for enabling the contents having the tempo corresponding to the absent tempo information to be obtained at the time of being connected to the personal computer 6 side as described later.

There is the possibility that the timing for connecting to the personal computer 6 is after the power of the portable playback device 5 is turned off, in this case, if the absent tempo information is held in volatile memory such as RAM or the like, it becomes difficult to request the relevant contents from the personal computer 6 side.

Therefore, the absent tempo information is saved in nonvolatile memory such as the HDD 34 or the like as described above. Note that in the event that nonvolatile memory other than the HDD 34 is separately provided, the absent tempo information can be saved therein.

Also, in the case of the present embodiment, an arrangement is made wherein in the event that determination is made that there are no relevant contents within the playback-device-side contents database 34*a*, a relevant contents absent notice is informed to the user. Specifically, for example, an arrangement is made wherein a message to the effect that there are no relevant contents is displayed on the display unit 27 using characters or the like.

Performing such a notice lets the user know that there are no compositions having the relevant tempo at the portable playback device 5 side, thereby attempting the user to perform connection to the personal computer 6 (i.e., connection for obtaining the relevant tempo contents from the personal computer 6 side).

Next, FIG. 12 illustrates functions realized by the CPU 61. A contents obtaining functional section 61*a* shown in the drawing is a functional section for realizing a function for generating a PC-side contents database 68*a* by obtaining contents and additional information thereof by ripping or downloading from the server device 4, and storing these in the HDD 68 in a correlated manner. That is to say, the function of the contents obtaining functional section 61*a* is realized by the previously described contents management application.

Also, a contents download (as to playback deice) functional section 61*b* is a functional section for downloading the contents and additional information thereof stored in the PC-side contents database 68*a* to the portable playback device 5. As described in FIG. 8, the user can selectively set regarding whether or not automatic synchronizing processing is performed at the time of downloading contents to the portable playback device 5.

In the event of the automatic synchronizing processing having been set, in response to connection between the personal computer 6 and the portable playback device 5 in a data-communicable state, the contents download (as to playback device) functional section 61*b* performs processing for automatically synchronizing between the contents of the PC-side contents database 68*a* and the contents of the playback-device-side contents database 34*a*. In the event of the automatic synchronizing processing having not been set, the contents download (as to playback device) functional section 61*b* does not perform the automatic synchronizing processing, and downloads the contents selected by user operations and the additional information thereof to the portable playback device 5 side.

The function serving as such a contents download (as to playback device) functional section 61*b* is also included in a part of the functions of the above contents management application.

In the case of the present embodiment, the functions serving as the following absent tempo contents automatic download (as to playback device) functional section 61*c* and absent tempo contents automatic obtaining (as to server) functional section 61*d* are newly added as the functions of the above contents management application.

First, the absent tempo contents automatic download (as to playback device) functional section 61*c* is, in response to the case in which absent tempo information is saved at the portable playback device 5 side by the absent tempo information saving functional section 21*d* as described above, a functional section for downloading the contents having the same tempo as the tempo shown by this absent information, and the additional information thereof to the portable playback device 5 side.

Now, let us say that with the personal computer 6 according to the present embodiment, an arrangement is made wherein as described above, the automatic synchronizing processing regarding contents databases is performed between the personal computer 6 and the portable playback device 5. In the event of such automatic synchronizing processing has been set, of the contents stored at the PC-side contents database 68*a* side, all of the contents other than the contents held at the portable playback device 5 side, and the additional information thereof are downloaded to the portable playback device 5 side.

In other words, in the event that the automatic synchronizing processing has thus been set, of the contents downloaded to the portable playback device 5 side, all that is necessary is to confirm regarding whether or not the contents having the same tempo as the absent tempo information are included.

Thus, as for specific processing operations corresponding to the case of the automatic synchronizing processing having been set, first, processing for synchronizing between the contents of the PC-side contents database 68*a* and the contents of the playback-device-side contents database 34*a* is performed as the automatic synchronizing processing.

Subsequently, confirmation is made regarding whether or not absent tempo information is saved at the portable playback device 5 side, and in the event that confirmation is made that absent tempo information is held, determination is made regarding whether or not the contents having the same tempo as the absent tempo information thereof exist within the PC-side contents database 68*a*.

In the event that determination is made according to this discrimination processing that there are the contents having the same tempo as the absent tempo information, it can be understood that the relevant contents have been downloaded to the portable playback device 5 side by the above synchronizing processing. In other words, thus, the operations as the absent tempo contents download (as to playback device) functional section 61*c* are completed.

Performing the operations serving as the absent tempo contents download (as to playback device) functional section

61*c* enables the contents having the same tempo as the user's exercise tempo, which were determined as no relevance at the portable playback device 5 side, to be downloaded to the portable playback device 5 side automatically without manual selection operations by the user.

On the other hand, in the event that the automatic synchronizing processing has not been set, the absent tempo contents download (as to playback device) functional section 61*c*, in response to absent tempo information being saved at the portable playback device 5 side, searches the contents having the same tempo as the absent tempo information thereof from the PC side contents database 68*a*, and in the event that the relevant contents exist, performs processing for downloading the contents and additional information thereof to the portable playback device 5 side.

Performing such operations enables the contents having the same tempo as the user's exercise tempo, which were determined as no relevance at the portable playback device 5 side, to be downloaded to the portable playback device 5 side automatically without manual selection operations by the user, even in the event that the automatic synchronizing processing has not been set.

Also, the absent tempo contents automatic obtaining (as to server) functional section 61*d* is a functional section for obtaining the relevant contents from the server device 4 side in response to the case in which determination is made that there are no contents having the same tempo as the absent tempo information within the PC-side contents database 68*a*, and transferring these to the portable playback device 5 side to allow the portable playback device 5 side to obtain these.

Specifically, with the absent tempo contents automatic obtaining (as to server) functional section 61*d* in this case, an arrangement is made wherein in response to the case in which as a result of search of the PC-side contents database 68*a* by the above absent tempo contents download (as to playback device) functional section 61*c*, determination is made that there are no relevant contents, connection processing as to the server device 4 is performed, following which a contents distribution request specifying the absent tempo information obtained from the portable playback device 5 is performed.

In response to the above distribution request from the personal computer 6 side, the server device 4 searches the contents having the same tempo as the tempo information specified by the distribution request from the server-side contents database 48*a* even in this case, and transmits the searched contents and the additional information thereof to the personal computer 6.

Thus, upon the relevant contents and the additional information thereof transmitted from the server device 4 side being received, the absent tempo contents automatic obtaining (as to server) functional section 61*d* first performs control processing so as to save the received contents and the additional information thereof to the PC-side contents database 68*a*. Specifically, the absent tempo contents automatic obtaining (as to server) functional section 61*d* performs control processing so as to record the received contents and the additional information thereof in the HDD 68 in a correlated manner.

Subsequently, the absent tempo contents automatic obtaining (as to server) functional section 61*d* enables the contents and the additional information thereof thus received from the server device 4 and saved to be transmitted to the portable playback device 5.

Performing such operations serving as the absent tempo contents automatic obtaining (as to server) functional section 61*d* enables the contents having the same tempo as the user's exercise tempo to be downloaded to the portable playback device 5 side automatically without manual selection operations by the user, even in the event that there are no relevant contents within the PC side content database 68*a*.

As described above, the absent tempo contents download (as to playback device) functional section 61*c* and the absent tempo contents automatic obtaining (as to server) functional section 61*d* provided at the personal computer 6 side enables the contents having the same tempo as the user's exercise tempo, which were determined as no relevance at the portable playback device 5 side, to be downloaded to the portable playback device 5 side from the PC-side contents database 68*a* or the server-side contents database 48*a* automatically without manual selection operations by the user.

Now, as described above, with the portable playback device 5 according to the present embodiment, an arrangement is made wherein in the event that determination is made that there are no contents having the same tempo as the measured exercise tempo within the playback-device-side contents database 34*a*, the tempo information thereof is saved as absent tempo information, but this operation enables the personal computer 6 to obtain the absent tempo information in the event of connecting to the personal computer 6 side, whereby the personal computer 6 side can obtain the contents having the tempo corresponding to the absent tempo information thereof as described above. That is to say, thus, the absent tempo information is saved, whereby the relevant contents can be obtained based on this absent tempo information when connecting to an external device.

Also, the personal computer 6 can, in response to the case in which absent tempo information is saved at the portable playback device 5, obtain the absent tempo information thereof, and confirm regarding whether or not there are the relevant contents within its own PC-side contents database 68*a*. Subsequently, in the event that determination is made that there are no relevant contents within its own database 68*a*, an arrangement is made as described above wherein a distribution request specifying the above absent tempo information is sent to the server device 4 over the network 3, whereby the contents having the relevant tempo (and additional information) can be obtained from the server device 4. Further, an arrangement is made wherein the contents having the relevant tempo thus obtained are transferred to the portable playback device 5, thereby enabling the portable playback device 5 to obtain the relevant contents.

<Processing Operations>

Next, description will be made regarding processing operations for realizing operations according to the second embodiment described above with reference to the flowcharts in the following FIGS. 13 through 17.

Figure 13:
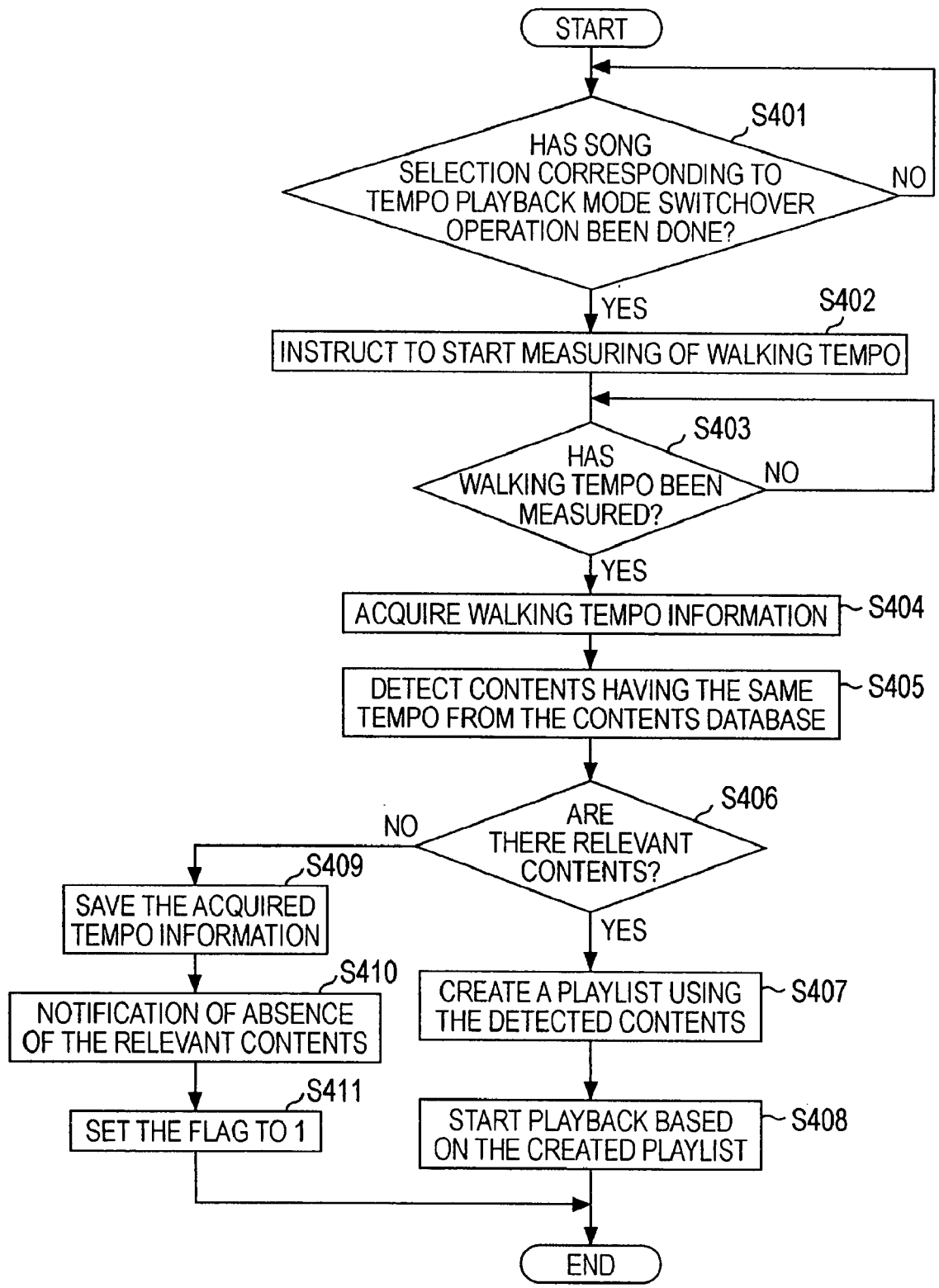
FIG. 13 is a flowchart illustrating processing operations to be performed principally for realizing the operations of a composition selection corresponding to tempo playback function and an absent tempo information saving function as processing operations to be executed for realizing the operations according to the second embodiment.

First, FIG. 13 illustrates the processing operations to be performed at the portable playback device 5 for realizing the function serving as the composition-selection-corresponding-to-tempo playback functional section 21*b* and the function serving as the absent tempo information saving functional section 21*d* described in FIG. 11. Note that the processing operations illustrated in this drawing are executed by the CPU 21 of the portable playback device 5 based on the program stored in the ROM 22.

In FIG. 13, the processing in steps S401 through S408 is the processing operations for realizing the function serving as the composition-selection-corresponding-to-tempo playback functional section 21*b*, and the contents thereof are the same as steps S101 through S108 described in FIG. 6. Accordingly, with regard to the processing operations according to these steps S401 through S408 for realizing the function serving as the composition-selection-corresponding-to-tempo playback functional section 21*b*, redundant description thereof will be omitted here.

Now, description will be made regarding the processing operations for realizing the function by the absent tempo information saving functional section 21*d*, as steps S409 through S411 in the drawing.

The processing operations for realizing the function serving as the absent tempo information saving functional section 21*d* are operations that are executed in the case in which with the discrimination processing shown in step S406, determination is made that there are no contents having the same tempo as the walking tempo measured within the playback-device-side contents database 34*a*.

In other words, in response to the negative result being obtained in step S406, the processing in steps S409 through S411 is executed.

First, in step S409, processing for saving the obtained tempo information is executed. Specifically, processing for recording the tempo information obtained in step S404 in a predetermined nonvolatile storing medium such as the HDD 34 or the like, for example.

In the subsequent step S410, a relevant contents absent notice is performed. Specifically, an arrangement is made wherein a notice to the effect that there are no contents having the same tempo as the measured exercise tempo within the database 34*a* is performed as to the user.

As described previously, such a relevant contents absent notice is performed by displaying a predetermined message made up of characters and so forth on the display unit 27. Specifically, in step S410, predetermined message data prepared beforehand is supplied to the display processing unit 28 as display data, and an instruction for displaying the relevant message data on the display unit 27 is performed.

Note that as for the relevant contents absent notice, for example, an audio notice can be employed as well as a visual notice by such message display. In this case, all that is necessary is that predetermined audio data (including electronic sound and so forth) is supplied to the audio signal processing unit 32 to audio-output this via the headphone amplifier 33.

Subsequently, in step S411, a flag is set to 1. This flag serves as an identifier for indicating that absent tempo information is saved at the personal computer 6 side at the time of connecting to the personal computer 6 side later. Here, an arrangement is made wherein setting the flag to 1 represents that absent tempo information is saved, and setting the flag to 0 represents that absent tempo information is not saved.

Next, FIGS. 14 through 17 illustrate principally processing operations for realizing the functions serving as the absent tempo contents automatic download (as to playback device) functional section 61*c* and absent tempo contents automatic obtaining (as to server) functional section 61*d* described in FIG. 12.

Note that with these drawings, the processing operations at the portable playback device side are executed by the CPU 21 of the portable playback device 5 shown in FIG. 9 based on the program stored in the ROM 22, and the processing operations at the personal computer 6 side are executed by the CPU 61 illustrated in FIG. 10 in accordance with the program stored in the memory unit 63, for example. Further, the processing operations at the server device side are executed by the CPU 41 of the server device 4 in accordance with the program stored in the memory unit 43.

Figure 14:
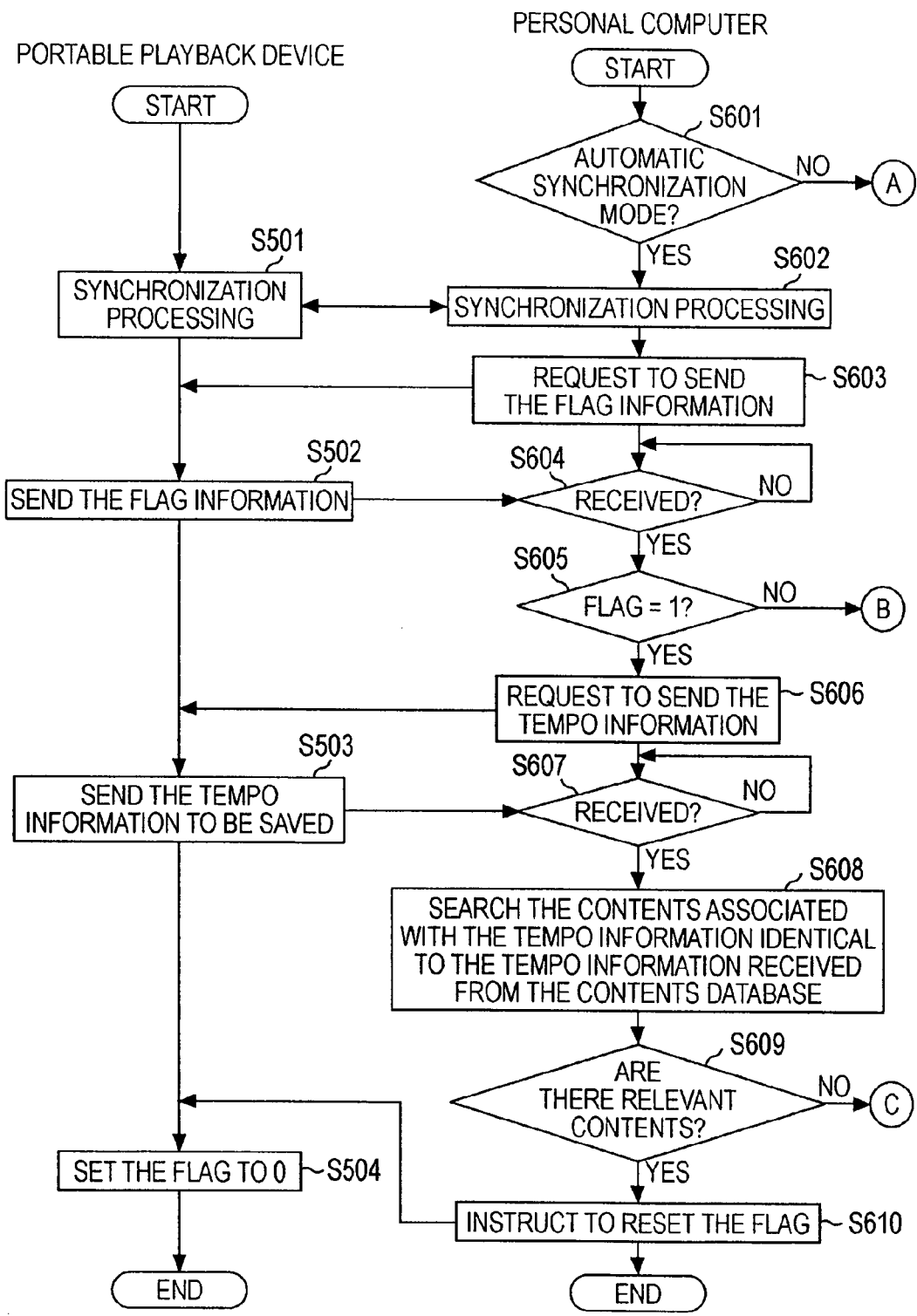
FIG. 14 is a flowchart illustrating processing operations to be performed principally for realizing the operations of an absent tempo contents automatic download function (at the time of setting automatic synchronizing processing) as processing operations to be executed for realizing the operations according to the second embodiment.

Also, in FIG. 14, let us say that the portable playback device 5 and the personal computer 6 have been already connected in a data-communicable state.

FIG. 14 illustrates the processing operations to be performed in response to principally the case in which the automatic synchronizing processing has been set, and also the case in which there are contents having the same tempo as the absent tempo information within the PC-side contents database 68*a*.

In FIG. 14, in step S601, with the personal computer 6, discrimination processing is first performed regarding whether or not the current mode is the automatic synchronizing mode. Specifically, with the personal computer 6 side, in response to connection with the portable playback device 5 side being established for example, the contents management application is automatically activated, and discrimination processing is performed regarding whether or not the automatic synchronizing processing has been set as the current setting.

Figure 17:
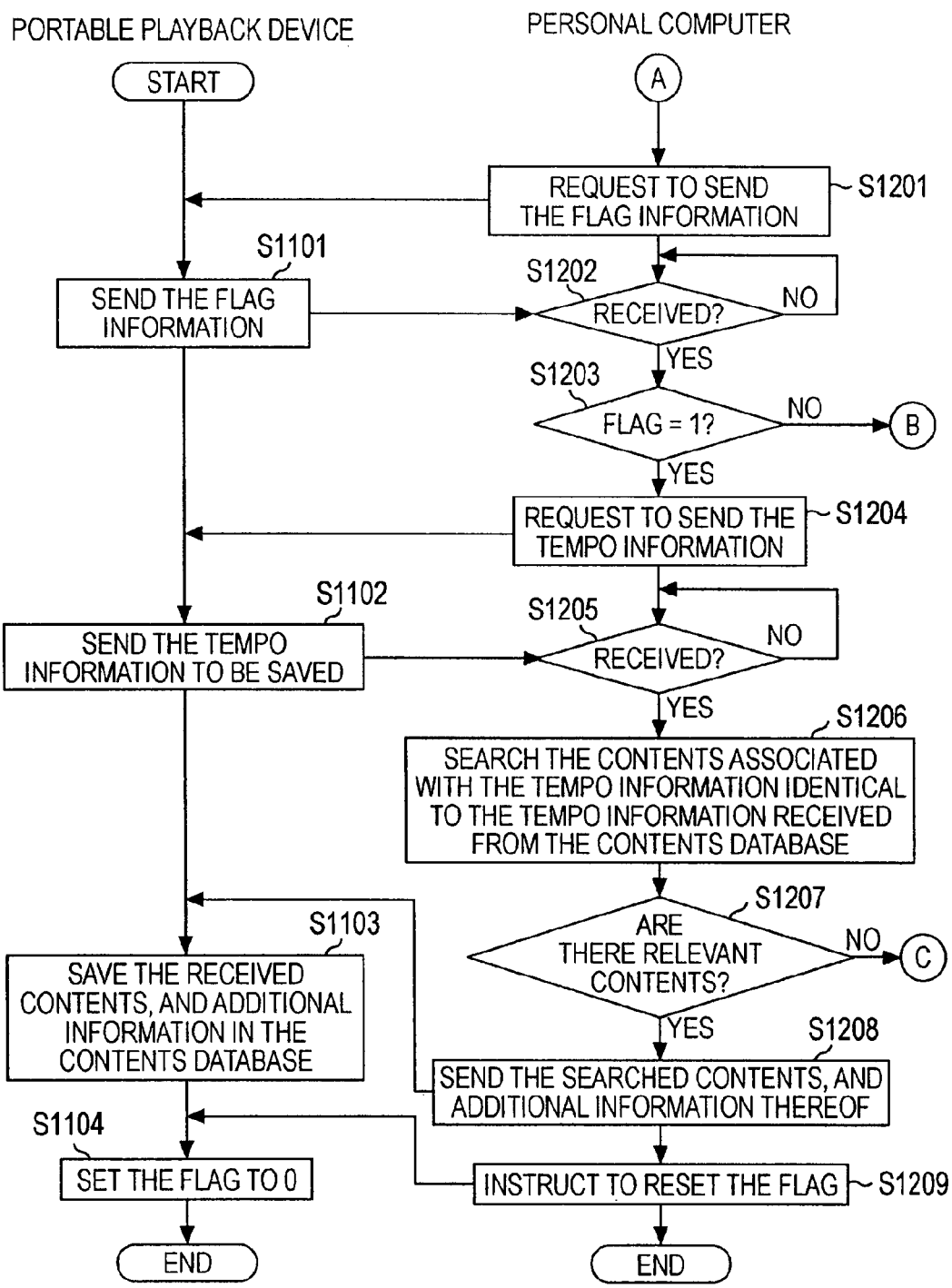
FIG. 17 is a flowchart illustrating processing operations to be performed for realizing the operations of an absent tempo contents automatic download function in the case of setting no automatic synchronizing processing as processing operations to be executed for realizing the operations according to the second embodiment.

In step S601, in the event that a negative result is obtained wherein the automatic synchronizing processing has not been set, a series of processing illustrated in later-described FIG. 17 is executed.

Also, in the event that a positive result is obtained wherein the automatic synchronizing processing has been set, the flow proceeds to step S602, as illustrated in the drawing.

In step S602, synchronizing processing is performed. Specifically, processing for synchronizing between the contents of the PC-side contents database 68*a* and the contents of the playback-device-side contents database 34*a* at the portable playback device 5 that is connected, is performed. Note here that the processing operations to be performed at the portable playback device 5 in response to this synchronizing processing at the personal computer 6 side are illustrated as the synchronizing processing in step S501 in the drawing. Thus, at the time of the synchronizing processing performed between the personal computer 6 and the portable playback device 5, various types of processing is performed, such as, for example, a transfer instruction of contents management information (information for managing a correlation between contents and additional information as described above) to the portable playback device 5 side, comparison between the transferred contents management information and the contents management information regarding the PC-side contents database 68*a*, transfer of contents and additional information thereof from the PC-side contents database 68*a* in accordance with the comparison result thereof, and so forth.

With the personal computer 6 side, in the subsequent step S603, a request to send the flag information as to the portable playback device 5 is performed.

In response to this request to send, with the portable playback device 5 side, as illustrated in step S502, the transmission processing of the flag information is performed. Specifically, control processing is performed so as to transmit the flag information for indicating regarding whether or not absent tempo information is saved, which was described in FIG. 13, to the personal computer 6 side via the USB interface 51.

The personal computer 6 side stands by in step S604 until the flag information thus transmitted from the portable playback device 5 side is received, and in the event of receiving the flag information, discrimination processing is performed in step S605 regarding whether or not the flag is equal to 1.

Figure 15:
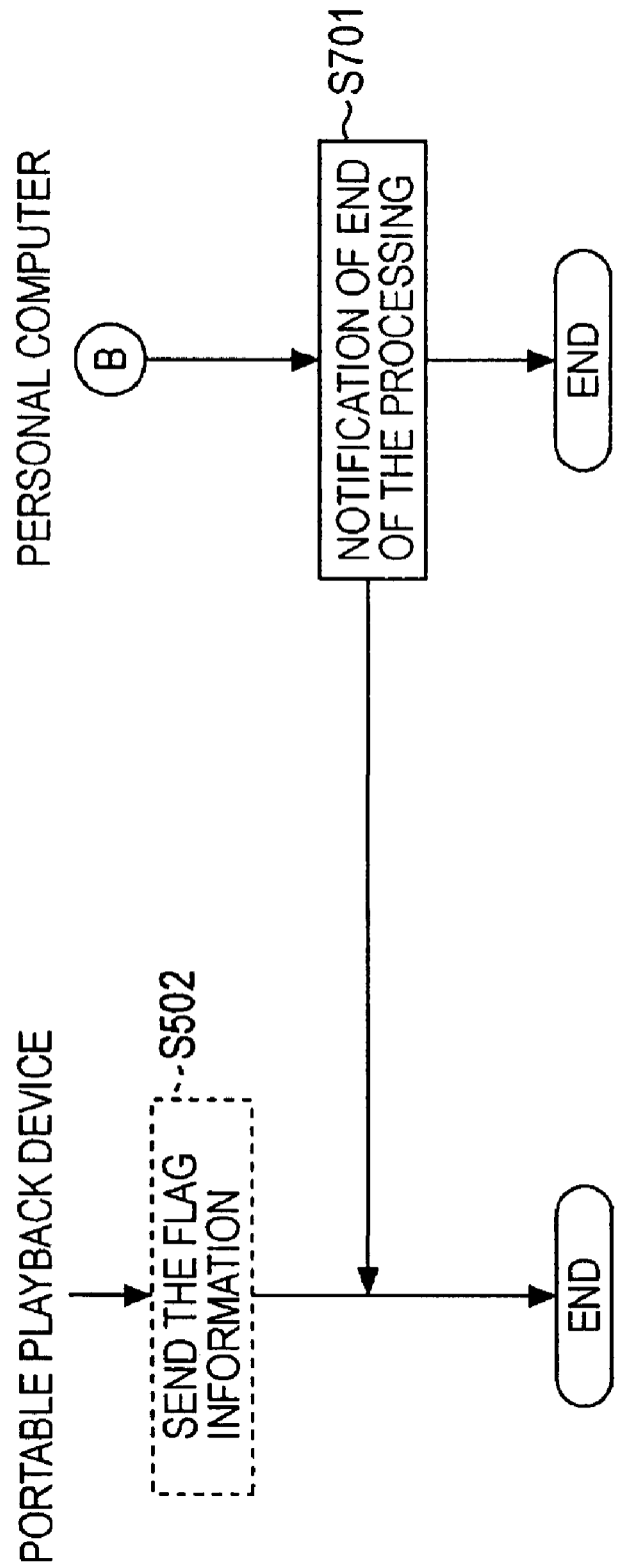
FIG. 15 is a flowchart illustrating processing operations to be performed principally for realizing the operations of an absent tempo contents automatic download function (at the time of setting automatic synchronizing processing) as processing operations to be executed for realizing the operations according to the second embodiment.

In the event that the flag is not equal to 1, i.e., in the event that a negative result is obtained wherein absent tempo information is not saved in the portable playback device 5, as illustrated in the next FIG. 15, in step S701, a processing end notice is sent to the portable playback device 5 side. Specifically, in this case, determination is made that there are no particular contents to be obtained at the portable playback device 5 side, and only the automatic synchronizing processing is performed, and the processing operations end.

With the portable playback device 5 as well, processing operations end in response to the above processing end notice.

Now, description will return to FIG. 14, where in the above step S605, in the event that the flag is equal to 1, i.e., in the event that a positive result is obtained wherein absent tempo information is saved at the portable playback device 5 side, the flow proceeds to step S606, where a request to send tempo information is performed.

In response to this request to send, with the portable playback device 5 side, as illustrated in step S503 in the drawing, a request to send the tempo information to be saved is performed. Specifically, in step S409 in FIG. 13, control processing is performed so as to transmit the absent tempo information recorded in a predetermined nonvolatile storing medium such as the HDD 34 for example to the personal computer 6 side via the USB interface 51.

Subsequently, the personal computer 6 side stands by in step S607 until this tempo information is received, and in the event of receiving the tempo information, searches the contents correlated with the same tempo information as the received tempo information from the contents database in step S608. Specifically, the personal computer 6 side searches the contents correlated with the same tempo information as the numerical value of the tempo information received from the PC-side contents database 68a.

In the subsequent step S609, discrimination processing is performed regarding whether or not there are the relevant contents. In the event that a negative result is obtained wherein determination is made that there have been no contents correlated with the same tempo information as the received tempo information within the PC-side contents database 68a as the relevant contents, the personal computer 6 side executes processing for obtaining the contents from the server device 4 side illustrated in the subsequent FIG. 16.

On the other hand, in step S609 in the event that a positive result is obtained wherein determination is made that there have been the relevant contents, in step S610 the personal computer 6 side sends a flag reset instruction to the portable playback device 5.

In response to this flag reset instruction, the portable playback device 5 side resets the flag to 0 as illustrated in step S504 in the drawing.

Thus, in response to the case in which the automatic synchronizing processing has been set, and also the case in which there are the relevant contents within the PC-side contents database 68a, the processing operations to be performed end.

Figure 16:
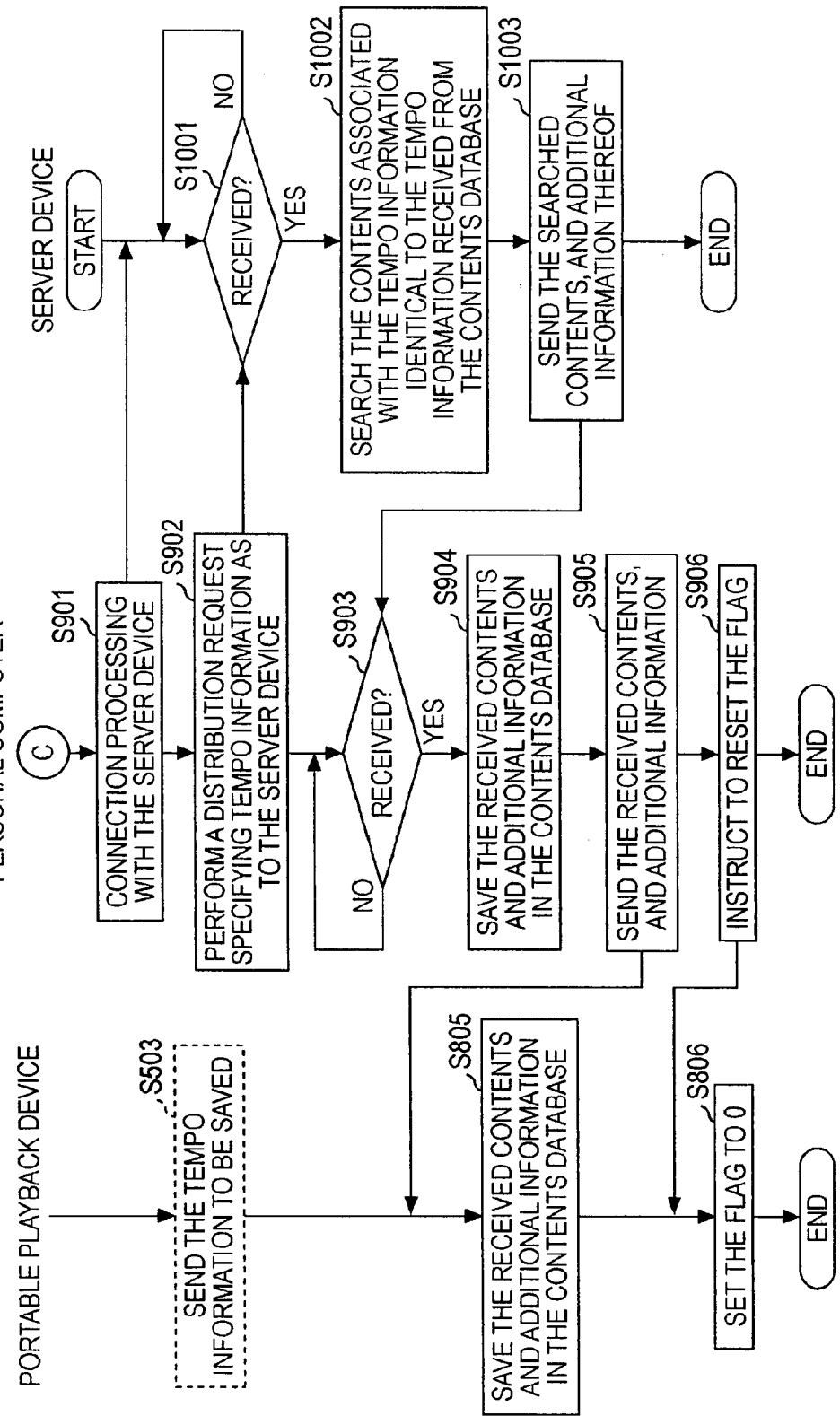
FIG. 16 is a flowchart illustrating processing operations to be performed principally for realizing the operations of an absent tempo contents automatic download function (at the time of setting automatic synchronizing processing) as processing operations to be executed for realizing the operations according to the second embodiment.

FIG. 16 illustrates the processing operations to be performed in response to the case in which a negative result is obtained in the above step S609, i.e., the case in which the automatic synchronizing processing has been set, and also the case in which there have been no contents having the same tempo information as the absent tempo information within the PC-side contents database 68a.

First, with the personal computer 6 side, in the event that a negative result is obtained in the above step S609, connection processing to the server device 4 is executed in step S901 in the drawing. Specifically, the personal computer 6 side executes control processing for connecting to the server device 4 via the network 3 in a data-communicable state, for example, by controlling the communication processing unit 69 or the like.

In the subsequent step S902, the personal computer 6 sends a distribution request specifying tempo information to the server device 4. Specifically, the personal computer 6 side performs control processing for sending a distribution request specifying the absent tempo information received from the portable playback device 5 side in step S607 in FIG. 14 to the server device 4.

The server device 4 side, following connection establishment with the personal computer 6 side, stands by in step S1001 until such a distribution request from the personal computer 6 side is received.

Subsequently, in the event of receiving the above distribution request, in step S1002 the server device 4 side searches the contents correlated with the same tempo information as the tempo information received from the contents database. Specifically, the server device 4 side searches the contents correlated with the same numerical value of tempo information as that of the tempo information specified by the above received distribution request from the server-side contents database 48a.

In the subsequent step S1003, the server device 4 executes processing for transmitting the searched contents and the additional information thereof to the personal computer 6. Specifically, the server device 4 controls the communication processing unit 49 to transmit the searched contents and the additional information thereof to the personal computer 6 via the network 3.

The personal computer 6 side stands by in step S903 until the above contents and the additional information thereof are received. Subsequently, in the event of receiving these contents and additional information, in step S904 the personal computer 6 performs control so as to save these received contents and additional information thereof in the PC-side contents database 68a. Specifically, the personal computer 6 performs control processing so as to record these received contents and information thereof in the HDD 68 in a correlated manner.

Additionally, in the subsequent step S905, the personal computer 6 performs processing for transmitting the received contents and additional information to the portable playback device 5. Specifically, the personal computer 6 performs control processing so as to transmit the contents and additional information received in the above step S903 to the portable playback device 5 via the USB interface 71.

Thus, transfer to the portable playback device 5 side regarding the contents and additional information obtained from the server device 4 side is performed.

The portable playback device 5 side, in the event of receiving the contents and the additional information thereof thus transmitted from the personal computer 6, performs processing for saving the received contents and additional information in the playback-device-side contents database 34a in step S805.

Also, following executing the transmission processing of the contents and additional information in the above step S905, the personal computer 6 side sends a flag reset instruction to the portable playback device 5 side in the subsequent step S906.

In response to this flag reset instruction, the portable playback device 5 side resets the flag to 0 in step S806 shown in the drawing.

Next, FIG. 17 illustrates the processing operations to be performed in response to the case in which a negative result is obtained in step S601 in FIG. 14, i.e., the case in which the automatic synchronizing processing has not been set.

In FIG. 17, the personal computer 6 side, in the event of obtaining a negative result in the above step S601, performs a request to send the flag information as to the portable playback device 5 in step S1201.

In response to this request to send, the portable playback device 5 side performs the transmission processing of the flag information as to the personal computer 6 side in step S1101 in the drawing.

The personal computer 6 side thus stands by in step S1202 until the flag information transmitted from the portable playback device 5 side is received, and in the event of receiving the flag information, performs discrimination processing regarding whether or not the flag is equal to 1 in step S1203.

In the event of obtaining a negative result wherein the flag is not equal to 1, and no absent information is saved in the portable playback device 5, the personal computer 6 side also executes the processing end notice (S701) shown in FIG. 15, and then processing operations end.

Also, in the above step S1203, in the event of obtaining a positive result wherein the flag is equal to 1, and also absent tempo information is saved at the portable playback device 5 side, the personal computer 6 side proceeds to step S1204, where a request to send the tempo information is performed.

In response to this request to send, the portable playback device 5 side performs the transmission processing of the tempo information saved such as shown in step S1102 in the drawing.

Subsequently, the personal computer 6 side stands by in step S1205 until this tempo information is received, and in the event of receiving the tempo information, searches the contents correlated with the same tempo information as the tempo information received from the contents database in step S1206.

Also, in the subsequent step S1207, the personal computer 6 side performs discrimination processing regarding whether or not the relevant contents exist.

In the event of obtaining a negative result wherein no contents serving as the relevant contents correlated with the same tempo information as the above received tempo information exist within the PC-side contents database 68a, the personal computer 6 side also executes the series of processing operations illustrated in FIG. 16. In other words, even in the event that the automatic synchronizing processing has not been set, in the event that no relevant contents exist within the PC-side contents database 68a, the personal computer 6 side obtains the relevant contents (and the additional information thereof) from the server device 4 side, and performs saving of the obtained contents, and transmission of the obtained contents to the portable playback device 5 side.

Also, the portable playback device 5 side, performs saving of the contents transmitted from the personal computer 6 side in response to this, and the flag reset processing (setting the flag to 0) in response to the flag reset instruction from the personal computer 6 side.

Also, in the event of obtaining a negative result wherein the relevant contents exist in the above step S1207, the personal computer 6 side performs processing for transmitting the searched contents and the additional information thereof to the portable playback device 5 side. In other words, the personal computer 6 side performs control processing so as to transmit the searched contents and the additional information thereof to the portable playback device 5 side via the USB interface 71.

In this case as well, the portable playback device 5 side, in the event of receiving the contents and the additional information thereof thus transmitted from the personal computer 6 side, performs processing for saving the received contents and additional information in the playback-device-side contents database 34a in step S1103 in the drawing.

Also, following executing the transmission processing of the contents and additional information in the above step S1208, the personal computer 6 side sends a flag reset instruction to the portable playback device 5 side in the subsequent step S1209.

In response to this flag reset instruction, the portable playback device 5 side resets the flag to 0 in step S1104 illustrated in the drawing.

<Modifications>As described above, description has been made regarding the embodiments of the present invention, but the present invention is not restricted to the respective embodiments described so far.

For example, with the above embodiments, the case in which contents include a composition (music) alone has been illustrated as an example, but the present invention can also be applied to, for example, a case in which contents are made up of a combination of music and video. In other words, with the present invention, it is sufficient for the contents to include at least music.

Also, according to the above respective embodiments, with the portable playback device (2, 5), contents are searched simply under the condition that contents to be searched include the same tempo as an exercise tempo, but even if contents have the same tempo, the user may be bored if the user hears the same contents each time.

In order to avoid this situation, an arrangement may be made wherein even if the searched contents have the same tempo, in the event that the number of times of playback is not less than the predetermined number of times, the portable playback device does not play this, and can obtain other contents having the same tempo from external equipment.

In this case, an arrangement is made wherein first the portable playback device (2, 5) counts the number of times of playback regarding the contents played under the composition selection corresponding to tempo playback mode, and holds the information of the number of times of playback thereof in correlated with each of the contents.

Subsequently, in response to switchover to the composition selection corresponding to tempo playback mode, in the event of searching the contents having the same tempo as the exercise tempo, the portable playback device (2, 5) refers to the number of times of playback of the searched contents, and with regard to the contents having the number of times of playback exceeding the predetermined number of times (excessive playback contents), the portable playback device (2, 5) prevents such contents from playback (e.g., such contents are not listed on a playlist, or the like), and obtains other contents having the same tempo from an external device.

As for specific operations, the portable playback device 2 according to the first embodiment performs a distribution request to the server device 4 via the network 3 specifying the information of the measured exercise tempo, and further information for determining the above excessive playback contents (e.g., title information or the like). In response to this, the server device 4 searches the contents having the same tempo as the exercise tempo specified with this distribution request, which are also correlated with determination information other than the specified contents determination information, from the server-side contents database 48a, and transmits the searched contents and the additional information thereof to the portable playback device 2.

The portable playback device 2 saves the contents and additional information received from the server device 4 side, adds the contents thereof to a playlist (i.e., selects as a playback object), and performs playback thereof.

According to such operations, in the event of playing the contents having the same tempo as the exercise tempo, of the relevant contents, the contents having the number of times of playback not greater than the predetermined number of times can be selected and played, thereby allowing the user to enjoy the contents having the same tempo as the exercise tempo without boring the user.

Note that minimally-necessary operations at the portable playback device side in this case is to perform a distribution request as to external equipment side, in the event that the contents searched as the contents having the same tempo as the exercise tempo have the number of times of playback not less than the predetermined number of times. There is the possibility that of the contents held at external equipment side, performing at least this operation enables the contents having the same tempo as the exercise tempo, and the number of times of playback not greater than the predetermined number of times to be obtained.

Also, as for the second embodiment, the subject of control is the personal computer 6 side, and accordingly, specific operations are different from the operations corresponding to the case of the above first embodiment. Specifically, in the case of the portable playback device 5 according to the second embodiment, operations are common until the excessive playback contents searched from the playback-device-side contents database 34a as described above are prevented from playback, but following which a distribution request is not performed, and the determination information for determining the information of the measured exercise tempo and the excessive playback contents is saved in a predetermined storing medium.

In this case, when the portable playback device 5 and the personal computer 6 are connected in a data-communicable state, the personal computer 6 side performs operations for allowing the portable playback device 5 side to obtain contents. Specifically, first, in the event that the automatic synchronizing processing has been set, the personal computer 6 side performs the synchronizing processing as to the portable playback device 5 side, following which, based on the exercise tempo and contents determination information-saved at the portable playback device 5 side as described above, searches the contents other than the contents having the same tempo as the exercise tempo thereof, and also determined with the contents determination information thereof from the PC-side contents database 68a, and in the event that there are the relevant contents, the personal computer 6 side ends the processing assuming that the contents thereof are obtained at the portable playback device 5 side.

On the other hand, in the event that determination is made that there are no relevant contents, the personal computer 6 side performs a distribution request specifying the above exercise tempo and the above contents determination information as to the server device 4 side. The operations at the server device 4 side in response to the distribution request specifying such an exercise tempo and contents determination information are the same operations as those described regarding the case of the first embodiment, i.e., the server device 4 side searches the contents other than the contents having the same tempo as the specified exercise tempo, and also determined with the specified contents determination information from the server side contents database 48a, and transmits the contents and additional information thereof to the personal computer 6 side. The operations at the personal computer 6 side in response to transmission of the contents and additional information thereof from the server device 4 side are the same operations as those described in the above FIG. 16 (S904 through S906), thereby enabling the portable playback device 5 to obtain the relevant contents.

Also, in the event that the automatic synchronizing processing has not been set, the personal computer 6 side, based on the exercise tempo and contents determination information saved at the portable playback device 5 side, searches the contents other than the contents having the same tempo as the exercise tempo thereof, and also determined with the contents determination information thereof from the PC-side contents database 68a, and in the event that there are the relevant contents, the personal computer 6 side transmits the contents and additional information thereof to the portable playback device 5 side. Also, in the event that determination is made that there are no relevant contents, the personal computer 6 side, as with the above case in which the automatic synchronizing process has been set, performs a distribution request specifying the exercise tempo and contents determination information as to the server device 4 side to obtain the relevant contents, following which transmits the contents and additional information thereof to the portable playback device 5 side.

According to such an operation, with the second embodiment as well, when playing the contents having the same tempo as the exercise tempo, of the relevant contents the portable playback device 5 can always selectively play the contents having a number of times of playback not greater than the predetermined number of times, thereby allowing the user to enjoy the contents having the same tempo as the exercise tempo without boring the user.

Also, with the above embodiments, an arrangement has been made wherein in the event that determination is made that there are no contents having the same tempo as the exercise tempo within the playback-device-side contents database 34a, the contents are obtained from the external equipment side of the portable playback device under just the condition that the contents have the same tempo as the exercise tempo, but according to this, the contents are obtained regardless of the genre, artist, and so forth, as long as the contents have the same tempo, and as a result thereof, contents whose genre or artist or the like the user does not care for very much may be obtained.

In order to avoid such a situation, for example as for a countermeasure to such a problem, an arrangement may be made wherein only the contents having the same tempo as the exercise tempo, and also correlated with predetermined attribute information can be obtained from the external equipment side.

For example, in this case, as a premise, it is necessary for the user to specify predetermined attribute information (e.g., genre or artist) as to the portable playback device (2, 5) beforehand.

Subsequently, first the portable playback device 2 according to the first embodiment, in the event that determination is made that there are no contents having the relevant exercise tempo within the playback-device-side contents database 34a, performs a distribution request specifying the measured exercise tempo and the above specified attribute information as to the server device 4.

Subsequently, the server device 4 side searches the contents having the same tempo as the exercise tempo specified with such a distribution request, and also correlated with the above specified attribute information from the server-side contents database 48a, and transmits the searched contents and additional information thereof to the portable playback device 2 side.

Also, the portable playback device 5 according to the second embodiment, in the event that determination is made that there are no contents having the relevant exercise tempo within the playback-device-side contents database 34a, saves the measured exercise tempo information, and further the above specified attribute information.

Subsequently, when the portable playback device 5 and the personal computer 6 are connected in a data-communicable state, the personal computer 6 performs operations for allowing the portable playback device 5 side to obtain the relevant contents based on these saved information. Specifically, in the event that the automatic synchronizing processing has been set, the personal computer 6 side performs synchronizing processing with the portable playback device 5 side, following which, based on the exercise tempo and attribute information saved at the portable playback device 5 side as described above, searches the contents having the same tempo as the exercise tempo thereof, and also correlated with the attribute information thereof from the PC-side contents database 68*a*, and in the event that there are the relevant contents, the personal computer 6 side ends the processing assuming that the contents thereof are obtained at the portable playback device 5 side. On the other hand, in the event that determination is made that there are no relevant contents, the personal computer 6 performs a distribution request specifying the above exercise tempo and the above attribute information as to the server device 4. The operations at the server device 4 side in response to this distribution request are the same operations as those described regarding the case of the first embodiment, i.e., the server device 4 side searches the contents having the same tempo as the specified exercise tempo, and also correlated with the specified attribute information from the server-side contents database 48*a*, and transmits the contents and additional information thereof to the personal computer 6 side. The operations at the personal computer 6 side in response to transmission of the contents and the additional information thereof from the server device 4 side are the same operations as those described in FIG. 16 (S904 through S906), thereby allowing the portable playback device 5 to obtain the relevant contents.

Also, in the event that the automatic synchronizing processing has not been set, the personal computer 6 side, based on the exercise tempo and attribute information saved at the portable playback device 5 side, searches the contents having the same tempo as the exercise tempo thereof, and also correlated with the attribute information thereof from the PC-side contents database 68*a*, and in the event that there are the relevant contents, transmits the contents and additional information thereof to the portable playback device 5 side. Also, in the event that determination is made that there are no relevant contents, the personal computer 6 side, as with the above case in which the automatic synchronizing processing has been set, performs a distribution request specifying the exercise tempo and attribute information as to the server device 4 side to obtain the relevant contents, following which transmits the contents and additional information thereof to the portable playback device 5 side.

These operations allow the portable playback device (2, 5), in the event that determination is made that there are no contents having the same tempo as the exercise tempo within the playback-device-side contents database 34*a*, to obtain only the contents having the same tempo as the exercise tempo and also correlated with predetermined attribute information from the external equipment side. In other words, those operations prevent the contents of the genre or artist for example the user does not care for very much from being selected and played as contents having the same tempo as the exercise tempo.

At this time, as described above, the portable playback device (2, 5) performs a distribution request specifying predetermined attribute information as well as the exercise tempo, or saves the predetermined attribute information along with the exercise tempo, thereby enabling the contents having the same tempo as the measure exercise tempo and also correlated with the predetermined attribute information to be obtained from the external equipment side.

Also, the personal computer 6 performs the operations based on the above description, thereby obtaining the contents having the same tempo as the measured exercise tempo and also correlated with the predetermined attribute information from its own PC-side contents database 68*a*, or from the server-side contents database 48*a* included in the server device 4 connected thereto via the network 3, transferring these to the portable playback device 5, and allowing the portable playback device 5 to obtain these.

In this case, the information of year of release can be also employed as the attribute information. In the event that the information of such year of release is employed as the predetermined attribute information, an arrangement may be made wherein of the contents having the same tempo as the exercise tempo, for example, only the contents having a predetermined year of release can be obtained at the portable playback device side.

Also, employing the information of year of release allows the portable playback device side to obtain only the contents determined as a newly released composition, for example, of the contents having the same tempo.

Specifically, for example, in the event of correlating this with the case of the first embodiment, the server device 4 side, in response to a distribution request specifying the tempo information from the portable playback device 2 side, searches only the contents having the same tempo and also correlated with the information of year of release not exceeding a predetermined year from the perspective of the present date, from the server-side contents database 48*a*. Subsequently, the server device 4 side transmits the searched contents and additional information thereof to the portable playback device 2 side.

At this time, a range of years of release may be specified by the portable playback device 2 side, or the server device 4 side may automatically search a range of years of release.

Alternatively, in the event of correlating this to the second embodiment, with regard to the above operations in the case of searching contents specifying the attribute information as well, the personal computer 6 performs operations in which the search conditions alone are modified. Specifically, when searching contents from the PC-side contents database 68*a*, the personal computer 6 modifies the search conditions so as to search only the contents having the same tempo as the absent tempo information and also correlated with the information of year of release not exceeding a predetermined year from the perspective of the present date. Also, in the event that there are no relevant contents as a result of this search, the personal computer 6 side performs a distribution request specifying the absent tempo as to the server device 4 side, but in response to this distribution request, the server device 4 side searches only the contents having the same tempo as the absent tempo information and also correlated with the information of year of release not exceeding a predetermined year from the perspective of the present date from the server-side contents database 48*a*, and transmits the searched contents and the additional information thereof to the personal computer 6 side. The operations of the personal computer 6 in response to receiving the contents and the additional information thereof transmitted from the server device 4 are also the same operations as those in FIG. 16 (S904 through S906)

Such operations allow the portable playback device side to obtain new composition contents as the contents having the same tempo as the exercise tempo, i.e., only the contents whose date of release is determined as the newest.

Also, the search function of contents whose search conditions are narrowed such as described above can be applied to the composition selection corresponding to tempo playback function at the portable playback device side.

Specifically, following the switchover to the composition selection corresponding to tempo playback mode, in response to measurement of an exercise tempo, of the contents having the same tempo as the exercise tempo thereof, only the contents correlated with predetermined attribute information are searched, or only the contents correlated with the information of year of release not exceeding a predetermined year from the perspective of the present date are searched.

Also, with the above description, the same tempo information as the exercise tempo has been defined with tempo information having the same numerical value as that of the exercise tempo. However, even if each of the values is not completely the same, in the event of a composition including a tempo having the relation of a multiple of the numerical value of the exercise tempo, the composition thereof can be defined as a composition having the same tempo as the exercise tempo.

Also, in the event of the user desiring to maintain a constant exercise tempo in accordance with the tempo of a composition, there has been an experimental result wherein if a composition having a tempo intentionally a little quicker than the exercise tempo is applied to the user, the exercise tempo thereof will be readily maintained. In this case, a composition having a tempo a little quicker than the exercise tempo becomes a composition having the same tempo as the exercise tempo.

Consequently, the same tempo information as the exercise tempo is not restricted to that of which the numerical value of the tempo is completely the same, which needs to be defined depending on intention and purpose in actual use.

However, in any case, if an arrangement is made as with the present invention wherein contents are searched from a contents database in which contents and tempo information thereof are correlated with each other based on an exercise tempo, a composition having the same tempo as the exercise tempo can be searched.

It should be understood by those skilled in the art that various modifications, combinations, sub-combinations and alterations may occur depending on design requirements and other factors insofar as they are within the scope of the appended claims or the equivalents thereof.

What is claimed is:

1. A playback device comprising:
    storing means for storing a first contents database in which contents comprising music and tempo information indicating a tempo of said music are correlated with each other;
    playback means for performing playback of said contents;
    tempo measuring means for measuring an exercise tempo obtained from body movements of a user;
    searching means for searching contents from said first contents database based on the exercise tempo and
    contents selecting means for selecting the contents searched by said searching means as contents to be played by said playback means, further comprising:
    communication means for performing data communication with an external device storing a second contents database in which contents comprising second music and second tempo information indicating a second tempo of said second music are correlated with each other; and
    distribution request control means for controlling said communication means to send a contents distribution request specifying the exercise tempo to said external device in the event that there are no relevant contents in said first contents database as a result of search by said searching means.

2. The playback device according to claim 1, wherein said searching means search contents based on the numerical value of the exercise tempo and a numerical value of said tempo information corresponding to each of contents in said first contents database.

3. The playback device according to claim 1, further comprising: playback control means for controlling such that the contents selected by said contents selecting means are automatically played by said playback means.

4. The playback device according to claim 1, wherein said distribution request control means, in the event that the relevant contents could not have been obtained from said external device, perform control so as to send said distribution request again at predetermined timing following the relevant contents thereafter.

5. The playback device according to claim 1, wherein said distribution request control means, in the event that a number of times of playback by said playback means of the contents selected by said contents selecting means is not less than a predetermined number of times, perform control so as to send a contents distribution request specifying the exercise tempo to said external device.

6. The playback device according to claim 1, wherein said first and second contents databases are further correlated with attribute information representing the attributes of each of contents as well as said tempo information; and
    wherein said distribution request control means perform control so as to send a contents distribution request specifying the exercise tempo and predetermined attribute information to said external device.

7. A contents distribution system comprising:
    a playback device;
    an information processing device; and
    a server device;
    wherein said playback device includes
        playback-device-side communication means for performing data communication with said information processing device,
        playback-device-side storing means storing a first contents database in which contents comprising music are correlated with tempo information indicating the tempo of said music,
        playback means for performing playback of said contents,
        tempo measuring means for measuring an exercise tempo obtained from body movements of a user,
        playback-device-side searching means for searching contents from said first contents database based on the exercise tempo measured by said tempo measuring means,
        contents selecting means for selecting the contents searched in said searching as the contents to be played by said playback means,
        tempo information holding means for, in the event that it has been found that there are no relevant contents at least in said first contents database as a result of search by said searching means, holding the tempo information thereof as absent tempo information, and
        playback-device-side transmission control means for controlling said playback-device-side communication means to transmit the absent tempo information held by said tempo information holding means to said information processing device based on an instruction from said information processing device;

and wherein said information processing device includes first information-processing-device-side communication means for performing data communication with said playback device, second information-processing-device-side communication means adapted to perform data communication with said server device via a certain network, information-processing-device-side storing means storing a second contents database in which second contents comprising second music are correlated with second tempo information indicating a second tempo of said second music, transmission instruction control means for controlling said first information-processing-device-side communication means to perform a transmission instruction regarding said absent tempo information to said playback device, information-processing-device-side searching means for, in the event of receiving said absent tempo information transmitted from said playback device in accordance with a transmission instruction performed by said transmission instruction control means, searching second contents from said second contents database, based on said absent tempo information, distribution request control means for controlling said second information-processing-device-side communication means to send a distribution request specifying said absent tempo information to said server device in the event that it has been found that there are no relevant contents as a result of search by said information-processing-device-side searching means, and contents transfer control means for, in the event of receiving the contents transmitted from said server device in accordance with the distribution request from said distribution request control means, controlling said first information-processing-device-side communication means to transfer the received contents to said playback device;

and wherein said server device includes server-side communication means for performing data communication with said information processing device via said network, server-side storing means storing a third contents database in which third contents comprising third music are correlated with third tempo information indicating a third tempo of said third music, server-side searching means for, in the event of said server-side communication means receiving a distribution request specifying said absent tempo information from said information processing device, searching third contents from said third contents database based on said absent tempo information, and server-side transmission control means for controlling said server side communication means to transmit the third contents searched by said server-side searching means to said information processing device.

8. A playback device comprising:

playback-device-side communication means for performing data communication with an external information processing device;

storing means storing a contents database in which contents comprising music are correlated with tempo information indicating a tempo of said music;

playback means for performing playback of said contents;

tempo measuring means for measuring an exercise tempo obtained from body movements of a user;

searching means for searching contents from said contents database based on the exercise tempo;

contents selecting means for selecting the contents searched by said searching means as the content to be played by said playback means;

absent tempo information holding means for, in the event that it has been found that there are no relevant contents in said contents database as a result of search by said searching means, holding the tempo information thereof as absent tempo information; and transmission control means for controlling said communication means to transmit the absent tempo information held by said absent tempo information holding means to said external information processing device based on an instruction from said external information processing device.

9. An information processing device comprising:

first communication means for performing data communication with an external playback device;

second communication means for performing data communication with an external server via a certain network;

storing means storing a contents database in which contents comprising music are correlated with tempo information indicating a tempo of said music;

transmission instruction control means for controlling said first communication means to perform a transmission instruction regarding absent tempo information as to said playback device;

searching means for, in the event of receiving said absent tempo information transmitted from said playback device in accordance with a transmission instruction performed by said transmission instruction control means, searching contents from said contents database, based on said absent tempo information;

distribution request control means for controlling said second communication means to send a distribution request specifying said absent tempo information to said server device in the event that it has been found that there are no relevant contents as a result of search by said searching means; and contents transfer control means for, in the event of receiving the contents transmitted from said server device in accordance with the distribution request from said distribution request control means, controlling said first communication means to transfer the received contents to said playback device.

10. A contents transfer method of an information processing device including first communication means for performing data communication with an external playback device, second communication means for performing data communication with an external server via a certain network, and storing means storing a contents database in which contents including at least music are correlated with tempo information indicating the tempo of said music, said contents transfer method comprising the steps of:

controlling said first communication means to perform a transmission instruction regarding absent tempo information as to said playback device;

searching contents, in the event of receiving said absent tempo information transmitted from said playback device in accordance with the transmission instruction performed in said controlling, from said contents database based on said absent tempo information;

controlling said second communication means to send a distribution request specifying said absent tempo information to said external server in the event that it has been found that there are no relevant contents as a result of search in said searching; and controlling said first communication means, in the event of receiving the contents transmitted from said server device in accordance with a distribution request in said distribution request controlling, to transfer the received contents to said playback device.

11. A storing medium storing a program to be executed at an information processing device including first communication means for performing data communication with an external playback device, second communication means for performing data communication with an external server via a certain network, and storing means storing a contents database in which contents including at least music are correlated with tempo information indicating the tempo of said music, said program causing said information processing device to execute the steps of:

controlling said first communication means to perform a transmission instruction regarding absent tempo information to said playback device;

searching contents, in the event of receiving said absent tempo information transmitted from said playback device in accordance with the transmission instruction performed in said controlling, from said contents database based on said absent tempo information;

controlling said second communication means to send a distribution request specifying said absent tempo information to said external server in the event that it has been found that there are no relevant contents as a result of search in said searching; and controlling said first communication means, in the event of receiving contents transmitted from said server device in accordance with a distribution request in said distribution request controlling, to transfer the received contents to said playback device.

12. A contents distribution system comprising:

a playback device;

an information processing device; and a server device;

wherein said playback device includes a playback-device-side communication unit for performing data communication with said information processing device, a playback-device-side storing unit storing a first contents database in which contents comprising music are correlated with tempo information indicating a tempo of said music, a playback unit for performing playback of said contents, a tempo measuring unit for measuring an exercise tempo obtained from body movements of a user, a playback-device-side searching unit for searching contents from said first contents database based on the exercise tempo, a contents selecting unit for selecting the contents searched in said searching as the contents to be played by said playback unit, a tempo information holding unit for, in the event that it has been found that there are no relevant contents at least in said first contents database as a result of search by said searching unit, holding the tempo information thereof as absent tempo information, and a playback-device-side transmission control unit for controlling said playback-device-side communication unit to transmit the absent tempo information held by said tempo information holding unit to said information processing device based on an instruction from said information processing device;

and wherein said information processing device includes a first information-processing-device-side communication unit for performing data communication with said playback device, a second information-processing-device-side communication unit adapted to perform data communication with said server device via a certain network, an information-processing-device-side storing unit storing a second contents database in which second contents comprising second music are correlated with second tempo information indicating a second tempo of said second music, a transmission instruction control unit for controlling said first information-processing-device-side communication unit to perform a transmission instruction regarding said absent tempo information as to said playback device, an information-processing-device-side searching unit for, in the event of receiving said absent tempo information transmitted from said playback device in accordance with a transmission instruction performed by said transmission instruction control unit, searching contents from said second contents database, a distribution request control unit for controlling said second information-processing-device-side communication unit to send a distribution request specifying said absent tempo information to said server device in the event that it has been found that there are no relevant contents as a result of search by said information-processing-device-side searching unit, and a contents transfer control unit for, in the event of receiving the contents transmitted from said server device in accordance with the distribution request from said distribution request control unit, controlling said first information-processing-device-side communication unit to transfer the received contents to said playback device;

and wherein said server device includes a server-side communication unit for performing data communication with said information processing device via said network, a server-side storing unit storing a third contents database in which third contents comprising third music are correlated with third tempo information indicating a third tempo of said third music, a server-side searching unit for, in the event of said server-side communication unit receiving a distribution request specifying said absent tempo information from said information processing device, searching contents from said third contents database based on said absent tempo information, and a server-side transmission control unit for controlling said server side communication unit to transmit the contents searched by said server-side searching unit to said information processing device.

13. A playback device comprising:

a playback-device-side communication unit for performing data communication with an external information processing device;

a storing unit storing a contents database in which contents comprising music are correlated with tempo information indicating a tempo of said music;

a playback unit for performing playback of said contents;
a tempo measuring unit for measuring an exercise tempo obtained from body movements of a user;
a searching unit for searching contents from said contents database based on the information of the exercise tempo measured by said tempo measuring unit;
a contents selecting unit for selecting the contents searched by said searching unit as content to be played by said playback unit;
an absent tempo information holding unit for, in the event that it has been found that there are no relevant contents as a result of search by said searching unit, holding the tempo information thereof as absent tempo information; and
a transmission control unit for controlling said communication unit to transmit the absent tempo information held by said tempo information holding unit to said external information processing device based on an instruction from said external information processing device.

14. An information processing device comprising:
a first communication unit for performing data communication with an external playback device;
a second communication unit for performing data communication with an external server via a certain network;
a storing unit storing a contents database in which contents comprising music are correlated with tempo information indicating a tempo of said music;
a transmission instruction control unit for controlling said first communication unit to perform a transmission instruction regarding said absent tempo information as to said external playback device;
a searching unit for, in the event of receiving said absent tempo information transmitted from said playback device in accordance with a transmission instruction performed by said transmission instruction control unit, searching contents from said contents database;
a distribution request control unit for controlling said second communication unit to send a distribution request specifying said absent tempo information to said server device in the event that it has been found that there are no relevant contents as a result of search by said searching unit; and
a contents transfer control unit for, in the event of receiving the contents transmitted from said server device in accordance with the distribution request from said distribution request control unit, controlling said first communication unit to transfer the received contents to said playback device.

15. A contents transfer method of an information processing device including a first communication unit for performing data communication with an external playback device, a second communication unit for performing data communication with an external server via a certain network, and a storing unit storing a contents database in which contents comprising music are correlated with tempo information indicating a tempo of said music, said contents transfer method comprising the steps of:
controlling said first communication unit to perform a transmission instruction regarding said absent tempo information as to said external playback device;
searching contents, in the event of receiving said absent tempo information transmitted from said playback device in accordance with the transmission instruction performed in said controlling, from said contents database based on said absent tempo information;
controlling said second communication unit to send a distribution request specifying said absent tempo information to said server device in the event that it has been found that there are no relevant contents as a result of search in said searching; and
controlling said first communication unit, in the event of receiving the contents transmitted from said server device in accordance with a distribution request in said distribution request controlling, to transfer the received contents to said external playback device.

16. A storing medium storing a program to be executed at an information processing device including a first communication unit for performing data communication with an external playback device, a second communication unit for performing data communication with an external server via a certain network, and a storing unit storing a contents database in which contents comprising music are correlated with tempo information indicating a tempo of said music, said program causing said information processing device to execute the steps of:
controlling said first communication unit to perform a transmission instruction regarding said absent tempo information as to said external playback device;
searching contents, in the event of receiving said absent tempo information transmitted from said external playback device in accordance with the transmission instruction performed in said controlling, from said contents database based on said absent tempo information;
controlling said second communication unit to send a distribution request specifying said absent tempo information to said server device in the event that it has been found that there are no relevant contents as a result of search in said searching; and
controlling said first communication unit, in the event of receiving the contents transmitted from said external server in accordance with a distribution request in said distribution request controlling, to transfer the received contents to said playback device.

* * * * *